United States Patent
Carter et al.

(10) Patent No.: US 10,430,099 B2
(45) Date of Patent: Oct. 1, 2019

(54) DATA PROCESSING SYSTEMS

(71) Applicant: ARM Limited, Cambridge (GB)

(72) Inventors: Quinn Carter, Ontario (CA); Lars Oskar Flordal, Uppsala (SE); Jakob Axel Fries, Malmö (SE); Andreas Due Engh-Halstvedt, Trondheim (NO)

(73) Assignee: Arm Limited, Cambridge (GB)

( * ) Notice: Subject to any disclaimer, the term of this patent is extended or adjusted under 35 U.S.C. 154(b) by 26 days.

(21) Appl. No.: 15/472,637

(22) Filed: Mar. 29, 2017

(65) Prior Publication Data

US 2017/0285955 A1     Oct. 5, 2017

(30) Foreign Application Priority Data

Mar. 30, 2016  (GB) .................................. 1605348.0
May 16, 2016   (GB) .................................. 1608555.7

(51) Int. Cl.
*G06F 3/06*      (2006.01)
*G09G 5/393*     (2006.01)
(Continued)

(52) U.S. Cl.
CPC ............ *G06F 3/064* (2013.01); *G06F 3/0604* (2013.01); *G06F 3/0673* (2013.01); *G06T 1/20* (2013.01);
(Continued)

(58) Field of Classification Search
CPC ...... H04N 19/13; H04N 19/91; H04N 19/184; H04N 19/93; H03M 7/40; H03M 7/30;
(Continued)

(56) References Cited

U.S. PATENT DOCUMENTS 6,130,680 A    10/2000  Cox et al.
8,542,939 B2   9/2013   Nystad
(Continued)

FOREIGN PATENT DOCUMENTS

GB   2515882   1/2015
GB   2519422   4/2015
GB   2525223   10/2016

OTHER PUBLICATIONS

Combined Search and Examination Report dated Oct. 3, 2016, GB Patent Application GB1605348.0.
(Continued)

*Primary Examiner* — Xiao M Wu
*Assistant Examiner* — Scott E Sonners
(74) *Attorney, Agent, or Firm* — Vierra Magen Marcus LLP

(57) ABSTRACT

A data array to be stored is first divided into a plurality of blocks. Each block is further sub-divided into a set of sub-blocks.
Data representing sub-blocks of the data array is stored, together with a header data block for each block that the data array has been divided into.
For each block, it is determined whether all the data positions for the block have the same data value associated with them, and, if so, an indication that all of the data positions within the block have the same data value associated with them, and an indication of the same data value that is associated with each of the data positions in the block, is stored in the header data block for that block of the data array.

13 Claims, 10 Drawing Sheets

(51) Int. Cl.
*G06T 1/20* (2006.01)
*G06T 1/60* (2006.01)
*G06T 11/40* (2006.01)

(52) U.S. Cl.
CPC ............... *G06T 1/60* (2013.01); *G06T 11/40* (2013.01); *G09G 5/393* (2013.01); *G06T 2210/08* (2013.01); *G09G 2360/12* (2013.01); *G09G 2360/122* (2013.01)

(58) Field of Classification Search
CPC .... H03M 7/3059; G06F 12/0886; G06T 9/00; G06T 9/005
See application file for complete search history.

(56) References Cited

U.S. PATENT DOCUMENTS

| | | |
|---|---|---|
| 8,990,518 B2 | 3/2015 | Nystad |
| 9,014,496 B2 | 4/2015 | Nystad |
| 9,116,790 B2 | 8/2015 | Nystad |
| 9,741,089 B2 | 8/2017 | Lassen et al. |
| 2003/0142523 A1 | 7/2003 | Biacs |
| 2004/0135781 A1 | 7/2004 | Shao et al. |
| 2006/0044317 A1 | 3/2006 | Bourd et al. |
| 2008/0273029 A1 | 11/2008 | Brennan |
| 2008/0273804 A1* | 11/2008 | Malewski ............. H04N 1/644 382/233 |
| 2011/0170756 A1 | 7/2011 | Schneider |
| 2013/0034309 A1 | 2/2013 | Nystad |
| 2014/0192075 A1 | 7/2014 | Stamoulis et al. |
| 2014/0368521 A1 | 12/2014 | Lassen et al. |
| 2015/0109293 A1 | 4/2015 | Wang et al. |
| 2016/0154739 A1 | 6/2016 | Jung et al. |
| 2017/0287101 A1 | 10/2017 | Flordal et al. |

OTHER PUBLICATIONS

Office Action dated Oct. 18, 2017, in U.S. Appl. No. 15/469,503, filed Mar. 25, 2017.
Amendment dated Jan. 17, 2018, in U.S. Appl. No. 15/469,503, filed Mar. 25, 2017.
Notice of Allowance dated Mar. 2, 2018, in U.S. Appl. No. 15/469,503, filed Mar. 25, 2017.
GB Combined Search and Examination Report dated Nov. 17, 2016, GB Patent Application GB1608555.7.

* cited by examiner

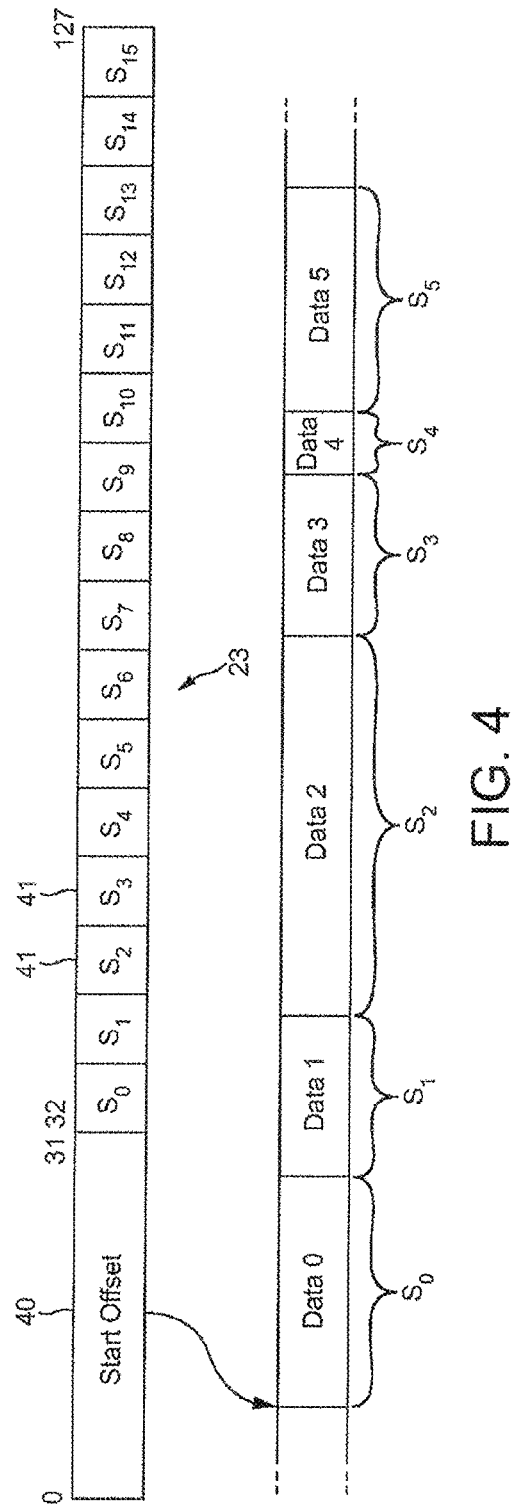

DATA PROCESSING SYSTEMS

BACKGROUND

The technology described herein relates to data processing systems and in particular to a method of and apparatus for storing data in memory in data processing systems, and in particular to such a method and apparatus for use to store texture data and frame buffer data in computer graphics processing systems.

As part of graphics processing, it is common to perform so-called "texture mapping", i.e. to generate colours (or other data) for sampling positions of the render output, such as an output frame for display, by applying so-called textures or texture data to the surfaces to be rendered. For example, surface detail on objects may be generated by applying a pre-defined "texture" to a set of primitives representing the object. Such textures are typically provided as a stored array of texture elements or "texels", each representing given texture data (such as colour, luminance, and/or light/shadow, etc., values), with the texels then being mapped on to the corresponding elements, such as (and, indeed, typically) a set of sampling positions, for the render output being generated. The stored arrays of texture elements (data) are typically referred to "texture maps".

The use of textures and texture mapping can provide higher image quality, but has a number of drawbacks. In particular, the storage of the texture data and accessing it in use can place, e.g. high storage and bandwidth requirements on a graphics processing device (or conversely lead to a loss in performance where such requirements are not met). This is particularly significant for mobile (portable) devices that perform graphics processing, as such devices are inherently limited in their, e.g., storage, bandwidth and power resources and capabilities.

It is known therefore to try to store such texture data in a "compressed" form so as to try to reduce, e.g., the storage and bandwidth burden that may be imposed on a device.

A further consideration when storing texture data (whether compressed or not) for use in graphics processing is that typically the graphics processing system will need to be able to access the stored texture data in a random access fashion (as it will not be known in advance which part or parts of the texture map will be required at any particular time). This places a further constraint on the storage of the texture data, as it is accordingly desirable to be able to store the texture data in a manner that is suitable for (and efficient for) random access to the stored data.

The Applicants have previously proposed in their U.S. Pat. Nos. 8,542,939B2, 9,014,496B2, 8,990,518B2 and 9,116,790 an improved arrangement for storing data, such as texture data for use in graphics processing, in memory. In this arrangement, an array of data, such as an array of texture data, is stored by dividing the array of data into a plurality of blocks, dividing each respective block of the data array into a plurality of sub-blocks, storing data representing each respective sub-block of data array in memory, and storing, for each respective block that the data array has been divided into, a header data block that contains data relating to and/or for the set of sub-blocks for the block of data array that the header data block relates to.

Notwithstanding the improved arrangements described in the Applicant's earlier US patents, the Applicants believe that there remains scope for improved arrangements for storing data, such as texture data for use in graphics processing, in memory.

BRIEF DESCRIPTION OF THE DRAWINGS

A number of embodiments of the technology described herein will now be described by way of example only and with reference to the accompanying drawings, in which:

FIGS. 4 and 6 show schematically the arrangement for a block of a data array of data in a header data block and a body buffer in memory in a second embodiment of the technology described herein;

FIG. 5 shows schematically the order of the stored sub-block data in the embodiment of FIG. 4;

Like reference numerals are used for like features throughout the drawings, where appropriate.

DETAILED DESCRIPTION

Figure 1:
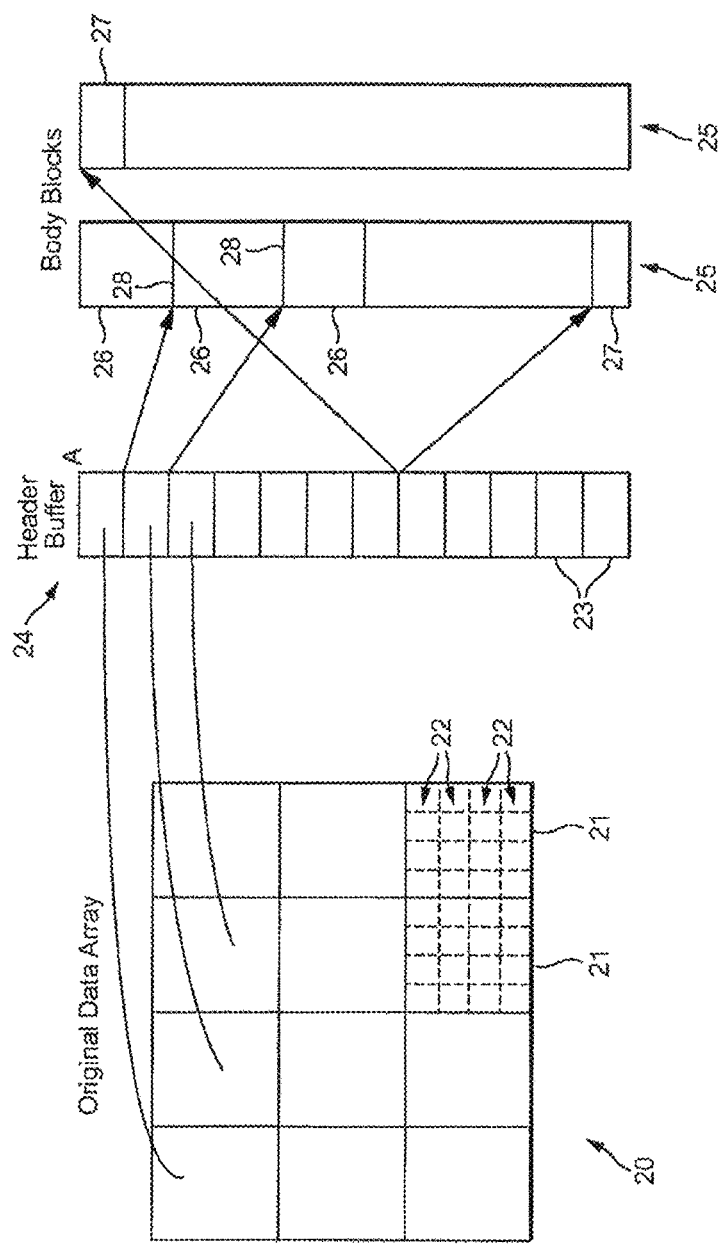
FIG. 1 shows schematically the storing of an array of data in accordance with an embodiment of the technology described herein.

A first embodiment of the technology described herein comprises a method of storing an array of data in a data processing system, the array of data comprising a plurality of data positions, in which:

the array of data to be stored is divided into a plurality of blocks, each block comprising a plurality of data positions of the array of data;

each respective block of the data array is divided into a plurality of sub-blocks, each sub-block comprising a plurality of data positions of the array of data; and data representing sub-blocks of the data array is stored in memory, and, for each respective block that the data array has been divided into, a header data block containing data relating to the sub-blocks for the block of the data array that the header data block relates to is stored;

the method comprising:

determining whether all the data positions for a block that the data array has been divided into have the same data value associated with them; and when it is determined that all of the data positions of a block that the data array has been divided into have the same data value associated with them:

storing in the header data block for that block of the data array an indication that all of the data positions within the block have the same data value associated with them, and an indication of the same data value that is associated with each of the data positions in the block.

A second embodiment of the technology described herein comprises an apparatus for storing an array of data in memory, the apparatus comprising:

processing circuitry configured to:

divide the array of data to be stored into a plurality of blocks, each block comprising a plurality of data positions of the array of data;

divide each respective block of the data array into a plurality of sub-blocks, each sub-block comprising a plurality of data positions of the array of data;

store data representing sub-blocks of the data array in memory; and store, for each respective block that the data array has been divided into, a header data block, the header data block containing data relating to the sub-blocks for the block of the data array that the header data block relates to;

wherein the apparatus further comprises processing circuitry configured to:

determine whether all the data positions for a block that the data array has been divided into have the same data value associated with them; and when it is determined that all of the data positions of a block that the data array has been divided into have the same data value associated with them:

store in the header data block for that block of the data array an indication that all of the data positions within the block have the same data value associated with them, and an indication of the same data value that is associated with each of the data positions in the block.

In the technology described herein, an array of data (which may be, as discussed above, an array of texture data or an array of frame buffer data) to be stored in memory is divided into plural blocks, and then each block is subdivided into plural sub-blocks for the purposes of storing the data array. Data representing the sub-blocks is then stored in memory, but together with header data blocks which contain data for the respective sub-blocks for the block which the header data relates to.

In the technology described herein, it is further determined whether all the data positions for a block that the data array has been divided into (and thus for all the sub-blocks for that data block) have the same data value. In that event, an indication of that is stored in the header data block for the block of the data array in question, together with an indication of the same data value that is associated with each of the data positions for the block.

As will be discussed further below, this then can facilitate better compression of such "same" data value blocks in a data array, and, correspondingly, can reduce processing and bandwidth requirements when reading and using the stored data array.

In particular, the technology described herein can, for example, remove the need to generate and store separate sub-block data for the sub-blocks of a data block that has the same data value associated with each of its data positions. This can correspondingly remove the need to perform a two level serial "lookup" to first fetch header data for the block of the data array, and thereafter then fetch sub-block data for the sub-blocks of the block of the data array. This can then improve latency for "same" data value blocks of a data array.

Furthermore, and as will be discussed further below, the Applicants have recognised that such same data value blocks within a data array can potentially be relatively straightforward to identify and accordingly encode (and thus compress) in the manner of the technology described herein, thereby enabling a more efficient and effective method and apparatus for storing an array of data, such as an array of texture data, in a compressed form.

The data array that is to be stored in the technology described herein can be any suitable data array. It should comprise a plurality of data elements (entries), each occupying different positions in the array. The data array in an embodiment represents an image.

In an embodiment the data array is a graphics texture.

However, the technology described herein is not exclusively applicable to graphics textures, and may equally be used for other forms of data array. For example, the Applicants believe the technology described herein may be equally useful for storing frame buffer data (for use as a frame buffer format), e.g. in graphics processing systems and for use with display controllers. Thus, in an embodiment the data array is a frame of data to be stored in a frame buffer, e.g. for display.

In an embodiment, the technology described herein is used both when storing texture data and as the frame buffer format in a graphics processing system. Thus, the technology described herein also extends to a graphics processing system and to a graphics processor that uses the arrangement of the technology described herein both for storing texture data and as its frame buffer format.

The technology described herein may also be used, for example, in image signal processing (image signal processors) and video encoding and decoding (video encoders and decoders).

The blocks that the data array (e.g. texture) to be stored is divided into can take any suitable and desired form. Each block should comprise a sub-set of the data elements (positions) in the array, i.e. correspond to a particular region (e.g. area or volume) of the array. In an embodiment the array is divided into non-overlapping and regularly sized and shaped, in an embodiment rectangular (including square), blocks. The blocks are in an embodiment square, but other arrangements could be used if desired. The blocks in an embodiment correspond to a block size that will otherwise be used in the data processing system in question. Thus, in the case of a tile-based graphics processing system, the blocks in an embodiment correspond to (have the same size and configuration as) the tiles that the rendering process of the graphics processing system operates on.

(In tile-based rendering, the two dimensional output array of the rendering process (the "render target") (e.g., and typically, that will be displayed to display the scene being rendered) is sub-divided or partitioned into a plurality of smaller regions, usually referred to as "tiles", for the rendering process. The tiles (sub-regions) are each rendered separately (typically one after another). The rendered tiles (sub-regions) are then recombined to provide the complete output array (frame) (render target), e.g. for display.

Other terms that are commonly used for "tiling" and "tile based" rendering include "chunking" (the sub-regions are referred to as "chunks") and "bucket" rendering. The terms "tile" and "tiling" will be used herein for convenience, but it should be understood that these terms are intended to encompass all alternative and equivalent terms and techniques.)

In an embodiment, the data array is divided into 8×8, 16×4 or 16×16 blocks (i.e. blocks of 8×8, 16×4 or 16×16 array positions (entries)). In an embodiment, 16×16 blocks are used. Thus, in the case of a texture map, for example, each block will in an embodiment correspond to 16×16 (or 8×8 or 16×4) texels, and in the case of a frame for the frame buffer, each block will in an embodiment correspond to 16×16 (or 8×8 or 16×4) pixels or sampling positions of the frame. Other arrangements would, of course, be possible.

The individual blocks of the data array can similarly be divided into any suitable and desired set of sub-blocks. Again, the sub-blocks should comprise a sub-set of the data elements (positions) that the block relates to, are in an embodiment non-overlapping and regularly-sized and shaped, are in an embodiment rectangular (including square), and are in an embodiment square (at least where the data blocks themselves are square). Other arrangements would, of course, be possible. In an embodiment, each data block is divided into 4×4 data position sub-blocks. Where 16×16 data blocks are used, each data block may accordingly be divided into sixteen 4×4 data position (data element) sub-blocks.

The data representing the sub-blocks of the data array can be any suitable and desired such data that will allow the data values of the sub-blocks' data positions to be reproduced.

The data representing the sub-blocks that is stored can take any suitable and desired form, and may, e.g., depend upon the nature of the data being stored, e.g. whether it is a texture, a frame for the frame buffer, whether and how it has been encoded, compressed, etc. The stored sub-block data should be, and is in an embodiment, some or all of the data of (for) the data array positions (entries) that the sub-blocks correspond to (represent).

The data that represents the sub-blocks may indicate directly the data array values for the data array elements (positions) that the sub-blocks correspond to, or it may be data from which these data array values can be derived (i.e. data to be used to determine, and to allow, the data array values for the data array elements (positions), to be determined). The latter will be the case where, for example, the stored data array is encoded and/or compressed before being stored. Thus, in an embodiment, the technology described herein comprises encoding, e.g. compressing, the original data entries in the data array, to generate an encoded, e.g. compressed, representation of the data values for those data entries, and then storing the encoded, e.g. compressed, representation of the data values as the data representing the sub-blocks.

In the case of a texture, for example, the data representing the sub-blocks that is stored should be data to allow appropriate texture data (texel values) for the sub-blocks to be determined. Such texture data could comprise, e.g., a set of colour values (Red, Green, Blue (RGB), a set of colour and transparency values (Red, Green, Blue, Alpha (RGBa)), a set of luminance and chrominance values, a set of shadow (light)-map values, a set of a normal-map (bump-map) values, z values (depth values), stencil values, luminance values (luminance textures), luminance-alpha-textures, and/or gloss-maps, etc.

In the case of a frame for display, to be stored in a frame buffer, the data representing the sub-blocks that is stored should be data to allow appropriate pixel and/or sampling position data (values) for the sub-blocks to be determined. Such pixel data could comprise, e.g., appropriate colour (RGB) values, or luminance and chrominance values.

The data representing the sub-blocks can be stored and provided in any suitable and desired manner. In an embodiment data representing each respective sub-block of the data array (from which each sub-block of the data array can be derived) is stored.

In an embodiment, sub-block data that is in addition to the header data contained in the header data blocks can be, and is in an embodiment, stored for sub-blocks of the data array.

In this case, for a block (and, e.g., for plural blocks) of the data array, a header data block containing data relating to the sub-blocks for the block of the data array in question would be stored, together with a set of separate sub-block data for one or more (e.g. for each) sub-block of the data array that the block of the data array in question has been divided into.

While it would be possible to store separate sub-block data for the sub-blocks for a block of the data array in addition to a header data block for each and every block that the data array has been divided into, in an embodiment, the storing of additional, separate sub-block data for the sub-blocks for a block of the data array (in addition to the header data for the block of the data array) is dependent on, and/or determined based on, the content (and in particular the data values of the data positions) of the block of the data array in question.

Thus in an embodiment, the data representing sub-blocks of the data array for a given block that the data array has been divided into may, e.g., and in an embodiment, be, in an embodiment selectively, stored in the header data block for the block of the data array in question (and e.g. only in the header data block), or may be stored as separate sub-block data, and/or may be stored in both the header data block and as separate sub-block data.

In an embodiment, if it is determined that all of the data positions of a block have the same data value associated with them, then only header data (a header data block) is stored for that block of the data array, but if it is determined that the data positions of a block of the data array do not all have the same data value associated with them (have differing data values), then both a header data block for that block of the data array and a separate set of sub-block data for the sub-blocks of the block in question is stored.

Thus, in an embodiment, the technology described herein comprises (and the processing circuitry is configured to):

when it is not (when it is other than) determined that all of the data positions of a block that the data array has been divided into have the same data value associated with them:

storing both a header data block for that block of the data array containing data relating to the sub-blocks for the block of the data array that the header data block relates to; and a separate set of sub-block data for the sub-blocks that the block of the data array relates to; and when it is determined that all of the data positions of a block that the data array has been divided into have the same data value associated with them:

storing for that block of the data array a header data block containing an indication that all of the data positions within the block have the same data value associated with them and an indication of the same data value that is associated with each of the data positions in the block, without also storing any further separate sub-block data for the sub-blocks that the block of the data array relates to.

Correspondingly, in an embodiment of the technology described herein, there will be some blocks of the data array for which a header data block only is stored, and other blocks of the data array for which both a header data block and separate, additional sub-block data is stored.

Where separate sub-block data (in addition to the header data) is being stored for a block of the data array, then in an embodiment, there is a separate set of sub-block data stored for a respective sub-block that the block of the data array has been divided into (i.e. there will be a set of sub-block data that is associated with a respective sub-block, from which, e.g., and in an embodiment, the data values for the sub-block in question can be derived, e.g., and in an embodiment, without reference to a set of sub-block data for any other sub-block).

In an embodiment, a separate set of sub-block data can be stored for each respective sub-block that a block of the data array has been divided into.

In such an arrangement, a separate set of sub-block data may be (and in an embodiment is) stored for each respective sub-block that a block of the data array has been divided into. In this case, the number of sets of sub-block data that are stored for the block of the data array in question will be equal to the number of sub-blocks that the block of data array has been divided into.

In other cases, plural sub-blocks of the sub-blocks that a block of the data array has been divided into may (and do) share the same set of sub-block data. In this case, in an embodiment one (and only one) set of sub-block is stored for the plural sub-blocks in question, such that the number of sets of sub-block data that are stored for the block of the data array in question will be less than the number of sub-blocks that the block of data array has been divided into. In these arrangements, there may be one set of sub-block data that is shared by (to be used for) all the sub-blocks that the block of the data array in question has been divided into, or the set(s) of sub-block data may be shared by some but not all of the sub-blocks that the block of the data has been divided into.

Where sub-block data in addition to a header data block is stored, the additional data representing (for) the sub-blocks can be stored in memory in any desired and suitable manner and arrangement.

In an embodiment, the set of sub-blocks for a given data block (the data representing the sub-blocks in the set of sub-blocks for a data block) are stored at contiguous locations, one after another, in memory.

Similarly, in an embodiment, the sets of sub-blocks for a given data array (i.e. the respective sets of sub-blocks for each block that the data array has been divided into) are stored together in the memory, one-after-another. In an embodiment, the sets of sub-blocks for a data array are stored in a body buffer in memory that has been assigned (set aside) for this purpose.

The header data blocks that are stored in the technology described herein may be configured and arranged as desired. There will be, and in an embodiment is, a separate header data block for each block that the data array being stored has been divided into. In an embodiment each header data block is the same, fixed (and in an embodiment predetermined) size. In an embodiment each header data block is of a size that is suitable for (and in an embodiment optimised for) fetching and caching in the data processing system in question. In an embodiment each header data block is 16, 32, or 64 bytes in size, in an embodiment 16 or 32 bytes in size.

The header data blocks can be stored in memory in any desired and suitable manner and arrangement. In an embodiment all the header data blocks for a data array are stored together, in a given part of the memory, which can accordingly be thought of as a "header buffer" for the stored data array. Thus, in an embodiment, all the header data blocks for a given data array are stored in a header buffer for the data array.

The header data blocks are in an embodiment stored at predictable memory addresses (locations). In an embodiment, they are stored at memory addresses (locations) that can be predicted from (that are determined from) the position of a data element and/or of the data block in the array that the header data block relates to. Thus, the storage location (memory address) of each header data block (e.g. within a header buffer having a known location in memory) is in an embodiment dependent upon the position within the data array of the block of the data array that the header data block relates to.

The content of the header data block for a given block of the data array may, and in an embodiment does, depend upon the content (the data values) for the data positions that the block corresponds to.

In particular, and in accordance with the technology described herein, in the case where it is determined that a block of the data array has the same data value for all of its data positions, then the header data block will contain an indication of that fact, and of the same data value that is to be used for the data positions of the block.

The indication that all of the data positions within the block have the same data value associated with them can take any suitable and desired form, such as, and in an embodiment, a suitable flag in the header data block that is predefined as being indicative of this.

Correspondingly, the indication of the same data value that is associated with each of the data positions in the block can take any suitable and desired form. Thus it may, for example, comprise a pointer to a location where the "same" data value is stored. In an embodiment, the indication that is included in the header data block allows the same data value to be determined directly from the indication in the header data block. Thus, in an embodiment, the same data value that is associated with each of the data positions in the block is stored in the header data block. The data value may be stored in a compressed (encoded) form, or may be stored in an uncompressed form. In an embodiment (and where the size of the header data block permits this), the same data value that is associated with each of the data positions in the block is stored in an uncompressed form in the header data block.

The actual data value that is indicated in the header data block can and should correspond to the data value or values in question that is stored in the data array. Thus, as discussed above, the data value that is indicated in the header data block may, e.g., comprise a colour value or values, or luminance and chrominance values, etc.

In the case where a block does not have all the same data values for its data positions, then the header data block for such a block in an embodiment contains other data and information relating to the sub-blocks in question for the block of the data array in question.

Where separate sub-block data is stored for a block that the data array has been divided into, then in an embodiment, the header data block for that block of the data array contains (fields for) pointer data indicating the location in memory of the data for the sub-blocks for the block of the data array that the header data block relates to. Such pointer data can take any desired and suitable form. It could, for example, indicate directly the memory location (address) of the sub-block data, or indicate it indirectly, e.g., as an offset from some other (known) memory location (address).

Such a header data block could include separate pointers to each of its respective sub-blocks, but in an embodiment, such a header data block includes (a field for) pointer data to a base, e.g., start, location (a base, e.g. start, address) in memory where the set of sub-blocks that the header relates to are stored, with the locations of the individual sub-blocks then being derived from that base, e.g., start, memory location. This can help to reduce the amount of pointer data that needs to be stored in a header data block. In an embodiment, the pointer data to the base location in memory for the set of sub-blocks that the header relates to indicates the offset (in an embodiment in bytes) from the start in memory of a header buffer for the data array in question to the start in memory of the stored set of sub-blocks that the header in question relates to.

In an embodiment such a header data block then also includes (fields for) data indicating the sizes in memory of the stored sub-blocks (of the stored data for the sub-blocks) that the header data block relates to, e.g. in bytes.

Thus, in an embodiment, such a header data block includes (fields for) pointer data indicating a base (e.g. start) memory location for the data for the set of sub-blocks that the header corresponds to, together with data indicating a size (in memory) for the data for some or all, and in an embodiment for each, of the sub-blocks in the set of sub-blocks.

(Each sub-block should correspondingly be stored in the memory at the location corresponding to the indicated sizes of the preceding sub-blocks (i.e. the sizes of the sub-blocks that are stored before it) (relative to the base memory location for the set of sub-blocks in question).)

In an embodiment, there is a separate size indication (field) for each sub-block of the set of sub-blocks for the data block that the header relates to. In this case, the header data block will include as many sub-block size indications (fields) as there are sub-blocks in the set of sub-blocks for the data block that the header relates to.

In one embodiment, each header data block contains both the pointer data and other useful data. This may particularly be possible where the header data blocks are configured to match the burst size (e.g. 64 bytes), as in that case it may be that each header data block will have the capacity to include more data than just the pointer data. In an embodiment, any such extra header data block data capacity is filled, at least in part, with other useful data. Such other useful data could, for example, and in an embodiment does, include data that is to be used in common for the sub-blocks that the header data block relates to when decoding the sub-blocks. It could also or instead, include data relating to a specific sub-block, although in an embodiment such data is only included in a header data block if there is still space after any "common" (shared) data has been included in the header data block.

In an embodiment, one or more sub-block size values that may be included in a header data block are predefined as (and set aside for) indicating a particular, special case or cases, such as a particular kind of data block, or a particular kind of sub-block, rather than a "true" sub-block size. In an embodiment these special case sub-block size values are sizes that a sub-block could not in practice be stored in, such as 0 or 1.

In an embodiment, one size indication value is predefined as indicating a "copy-block" sub-block, i.e. that the sub-block to which the size indication relates is a copy of (is the same as) the previous sub-block (the immediately preceding sub-block in the data array), i.e. that the same data as would be used for the previous sub-block should be used for the sub-block in question.

If such a "copy" sub-block is identified and indicated, a separate set of sub-block data is not stored for the "copy" sub-block (and the decoder is configured and triggered to use the data for the other sub-block instead).

In arrangements where a header data block includes or can include pointer data pointing to the location in memory where data for a sub-block of the data array is stored, then in an embodiment, a particular, in an embodiment selected, value of the pointer data is used for indicating (is predefined as indicating) that all the data positions for the block that the header data block relates to have the same data value associated with them.

In an embodiment, where the header data blocks have the data structure discussed above, then the "copy block" sub-block size indication is also able to be used to indicate that all of the data positions within the block have the same data value associated with them. In this case, the presence of such a "copy block" sub-block size indication value in a particular, in an embodiment selected, position in the header data block is defined as indicating and used to indicate that all of the data positions within the block have the same data value associated with them. In an embodiment, the size indication (field) for the first sub-block of the set of sub-blocks for the data block that the header data block relates to is used for this purpose, i.e. if the appropriate predefined size indication value is present in that size indication field in a header data block, then that is taken as indicating that all of the data positions within the block have the same data value associated with them.

Thus, in an embodiment, the presence of a particular, in an embodiment selected, in an embodiment predefined, data value in a particular, in an embodiment selected, in an embodiment predefined, position (e.g. field) in the header data block is used to indicate that all of the data positions within the block have the same data value associated with them. Correspondingly, the presence of a particular data value in a particular position (e.g. field) within a header data block that can and is otherwise used for other purposes within the header data block in the event that a block of the data array does not have the same data value for all of its data positions, is in an embodiment used to indicate that all of the data positions within the block have the same data value associated with them.

Thus, in an embodiment each header data block has predefined fields for storing pointer data to be used to determine the location in memory where data to be used to reproduce sub-blocks of the data array that the header data block relates to is stored, and at least one of the pointer data values that can be included in a header data block is predefined as indicating that all of the data positions within the block have the same data value associated with them. In an embodiment that pointer data value is only interpreted as indicating that all of the data position values within the block have the same data value associated with them if it appears in a particular pointer data value field within the header data block. Thus, in an embodiment, a combination of a particular pointer data value in a particular pointer data value field within a header data block is predefined as indicating that all of the data positions within the block have the same data value associated with them.

Correspondingly, for a "same data value" block, the indication of the same data value that is associated with each of the data positions in the block is also stored in a particular, in an embodiment predefined, position within the header data block. Thus, in an embodiment, there is a predefined structure for the header data block that is to be used when a block of the data array has the same data value for all of its data positions.

In an embodiment, save for the particular treatment of "same data value" blocks described herein, the data array and the header data and separate sub-block data (if present) is arranged and encoded in the manner described in the Applicant's U.S. Pat. Nos 68/542,939B2, 9,014,496B2, 8,990,518B2 and 9,116,790B2.

It will be appreciated that the above processes should be, and in an embodiment are, repeated for plural blocks, and in an embodiment for each block, that the data array has been divided into for storing and encoding purposes. Correspondingly, the process is in an embodiment performed and repeated for plural data arrays to be stored, e.g., and in an embodiment, representing a sequence of frames to be displayed.

The data for the data array can be processed to generate the data for the sub-blocks and the header data blocks in any suitable and desired manner. For example, a suitable processor or processing circuitry may read the original data array to be stored from memory, and/or receive a stream of data corresponding to the original data array to be stored, and then process the data array accordingly, i.e. to divide it into blocks and sub-blocks, and generate the necessary header data blocks and, e.g. encoded, sub-blocks' data, and then store the data in memory.

As part of the processing of a data array in the manner of the technology described herein, it will, as discussed above, be determined whether all the data positions for blocks that the data array has been divided into have the same data value associated with them or not, with the blocks of the data array then being encoded accordingly.

It can be determined whether a block that the data array has been divided into has the same data value associated with all of the data positions for the block in any suitable and desired manner.

In an embodiment, this is done by comparing the data values for each of the data positions of the block of the data array in question. In an embodiment this is done by reading the data values for the data positions of the data block from memory and comparing them, to see if they are all the same.

Correspondingly, in the case where the data array that is being processed and encoded in the manner of the technology described herein is received as a stream of data, a sequence of data position values could be compared, e.g. as they are received, to see if they are all the same.

Where each data position in the data array has plural data channels (e.g. colour channels) associated with it, then the data positions for a block of the data array may be considered to all have the same data value only if the data value for each respective data channel is the same for each of the data positions of the block. Alternatively, e.g. where different data channels of the data array can be and/or are, encoded separately, then the process could operate to identify same data value blocks on a, e.g., data channel-by-data channel basis.

In the case where the data array that is being processed in the manner of the technology described herein is being generated as blocks of the data array that are stored in a buffer prior to the data array being written out to memory, such as may be the case where a tile-graphics based processing system is generating the data array, and/or the data array is being generated by decoding a stream of encoded video image data, then in an embodiment, the presence of a block of a data array for which all the data positions for the block have the same data value associated with them is done based on the processing of the blocks of the data array ahead of the data being written to the buffer, and/or on the writing of data for the data array to the buffer.

Thus, in an embodiment, the technology described herein is implemented in a block-based data processing system that comprises a buffer configured to store blocks of data positions of a data array prior to the data array being written out to memory; and the method comprises (and the apparatus is configured to):

processing blocks of the data array to generate blocks of data for the data array;

writing the blocks of the data array to the buffer;

identifying, based on the processing of the blocks of the data array ahead of the data being written to the buffer and/or on the writing of data to the buffer, whether a block of the data array has the same data value associated with each of the data positions of the block.

Identifying blocks of data positions having the same data value, based, e.g., on the writing of the data to a buffer, makes it possible to identify such blocks of a data array without, e.g., having to read all the data that is stored in the buffer (or otherwise in memory) for the block in question.

In these embodiments, the identification of a block of same data value positions can be identified based on the processing of the blocks of the data array ahead of the data array being written to the buffer and/or on the writing of data array data to the buffer in any suitable and desired manner.

For example, in a video processing system in which a video decoder receives and decodes a stream of encoded video image data (which may then be written to memory before it is displayed), the video decoder (or associated processing circuitry) may be operable to identify a block of data positions having the same data (e.g. colour) value. For example, the (e.g. absence of) transform coefficients in the encoded video image data for a block of data positions (and, e.g., with no other sources of entropy (entropy encoded data)), may indicate that the block has the same data (e.g. colour) value for each of its sampling positions.

Thus, in an embodiment, the method and apparatus of the technology described herein is used in a video decoder arranged to decode blocks of encoded video image data, and the video decoder is operable, based on the decoding of the blocks of encoded video image data ahead of the decoded video image data being written to a, e.g. frame, buffer, to identify blocks of sampling positions having the same data value associated with them, e.g., and in an embodiment, based on the decoding of the blocks of encoded video image data, e.g. using transform coefficients for a block that has no other sources of entropy.

In an embodiment, the method and apparatus of the technology described herein is used in a tile-based graphics processing pipeline, and operates to identify, based on the writing of rendered fragment data to the tile buffer for a tile, whether all the data (i.e. sampling) positions within the tile have the same data value associated with them (and to then encode the tile accordingly).

Thus, in an embodiment the technology described herein is implemented in a tile-based graphics processor that comprises:

a tile buffer configured to store rendered fragment data for sampling positions locally to the graphics processor prior to the rendered fragment data being written out to memory;

and the method comprises (and the apparatus is configured to):

when rendering graphics fragments to generate rendered fragment data, each graphics fragment having associated with it a set of one or more sampling positions to be rendered in a tile, and writing the rendered fragment data for sampling positions in the tile to the tile buffer:

identifying, based on the writing of rendered fragment data to the tile buffer for a tile, whether a block comprising a plurality of sampling positions within the tile has the same data value associated with each of the plurality of sampling positions in the block; and when a block of sampling positions within a tile each having the same data value associated with them is identified, storing a header data block in the manner of the technology described herein for the block of sampling positions.

In these embodiments, blocks of same data value data (sampling) positions may be identified, based on the writing of rendered fragment data to the tile buffer for a tile, in any suitable and desired way.

In one embodiment this is done based on whether the sampling positions in the tile buffer are written to or not when a tile is rendered. In an embodiment a same data value block of data positions is identified based on the absence of writing (rendered fragment data) to the sampling positions in the tile buffer for the block when the tile is rendered (with such a "clear" block of sampling positions then being identified as and treated as a same data value block of data positions).

It will be appreciated that in these arrangements where a block of sampling positions that has not been written to when rendering a tile is identified as a constant, same data value block, then the same (constant) data value that is associated with each of the plurality of sampling positions in the block will not be a data value that was written to the block of sampling positions when rendering the tile, but rather will, in effect, be a data value (such as a "clear" value) that is to be used when no rendered fragment data is actually written to a sampling position when rendering a tile. Thus, in these cases the constant data value for the block of sampling positions will, e.g., be a default or "clear" data value that is to be used when there is no rendered fragment data for a sampling position (such as a default, e.g. background, data value (e.g. colour) that should be used for a sampling position in that event). The default or "clear" data value to be used when there is no rendered fragment data for a sampling position may, for example, be indicated by a separate render output (e.g. frame) descriptor that is, e.g., read once per render output (frame).

The determination that no rendered fragment data will be or has been written to sampling positions in the tile buffer when rendering a tile may be determined at any suitable and desired stage of the processing pipeline.

In one embodiment a block of sampling positions to which no rendered fragment data will be written to the tile buffer when rendering the tile (i.e. a "clear" block) is identified at the rasterising stage (i.e. when input primitives are rasterised to generate graphics fragments to be processed), e.g., and in an embodiment, by identifying block(s) comprising a plurality of sampling positions within a tile for which no fragments have been generated by the rasterising stage (process) (i.e. for which there are no primitives at least partially covering the sampling positions).

In another embodiment a block of "clear" (unwritten) sampling positions is identified at the tile buffer writing stage (based on the operation of writing rendered fragment data for the tile to the tile buffer (as data is being written to the tile buffer (or not)), in an embodiment based on (the absence of) write transactions at the write port of the tile buffer.

The identification of a "clear" block of sampling positions from the writing of the rendered fragment data for a tile to the tile buffer may be performed in any suitable and desired manner. In an embodiment the writing (and thus, e.g., also the absence of writing) of rendered fragment data to the sampling positions in the tile buffer for a tile is tracked as that data is written to the tile buffer (as the tile is rendered), with block(s) comprising a plurality of sampling positions within a tile to which no rendered fragment data is written in the tile buffer when rendering the tile then being identified based on the tracking of the writing of rendered fragment data to the tile buffer.

The writing or not of rendered fragment data to the sampling positions of a tile may be tracked in any suitable and desired way. In an embodiment a ("clear bits") bitmap is used to track the writing of rendered fragment data to the tile buffer, as that data is written to the tile buffer.

In this arrangement, once (e.g. all the) rendered fragment data for the array of sampling positions in the tile has been written to the tile buffer (and thus the tracking information, e.g. bitmap, indicates, for each sampling position, whether rendered fragment data has been written to the tile buffer for the sampling position or not), the tracking information, e.g. bitmap, is then in an embodiment used to identify any blocks comprising a plurality of sampling positions within the tile that are have not been written to when rendering the tile (i.e. that are each "clear") (which may be the whole tile when no rendered fragment data is written to it the tile buffer for the tile at all, or may be some portion of the tile for which no data is written).

In an embodiment, constant data value blocks of sampling positions can be and are also or instead (and in an embodiment also) identified for blocks of sampling positions for which data is written to the tile buffer as a tile is rendered (i.e. for blocks of sampling positions for which rendered fragment data is present in the tile buffer). In this case, a constant data value block will be identified in the case that the same data value(s) is written to the sampling positions of the whole block as the tile is rendered.

Thus in an embodiment the apparatus and method is operable to identify, based on the writing of rendered fragment data to the tile buffer for a tile, a block (e.g. tile) of sampling positions that has the same data value or set of values (e.g. for one or more of the, e.g. RGB, colour channels) written to it as rendered fragment data associated with each of the plurality of sampling positions in the block.

A block of sampling positions that has had the same rendered fragment data value(s) written to it may be identified at any suitable and desired stage of the graphics processing pipeline.

In one embodiment same data (e.g. colour) value(s) blocks of sampling positions are identified by tracking the rendered fragment data that is written to the tile buffer as that data is written to (is being written to) the tile buffer, in an embodiment based on write transactions at the write port of the tile buffer.

Thus in an embodiment the writing of a or plural particular rendered fragment data value(s) (or set(s) of data values) to the sampling positions in the tile buffer for a tile is tracked as that data is written to the tile buffer (e.g., and in an embodiment, based on the data values and write transactions appearing at the tile buffer's write port), with a block comprising a plurality of sampling positions within a tile that has associated with each of the sampling positions of the block rendered fragment data comprising the same (particular) data value (or set of data values) (if any), then being identified based on the tracking of the particular data value(s) (or set(s) of data values) in the rendered fragment data being written to the tile buffer.

A block of plural sampling positions having the same data (e.g. colour) value (or set of data (e.g. colour) values) associated with them in the rendered fragment data may be determined from tracking the data value(s) as the rendered fragment data is written to the sampling positions in the tile buffer for a tile in any suitable and desired way.

In an embodiment, each data value (or set of data values) that is written to a sampling position in the tile as it is being rendered is compared to a particular data value or set of data values to see if it is the same as the particular data value or set of data values or not. This process is in an embodiment continued for so long as data values being written to the tile match the comparison data value or set of data values.

Correspondingly, in this embodiment, when a different data value is detected, it will be determined that the tile does not have the same data value written to each of the sampling positions in the tile buffer. Thus, this embodiment facilitates identifying when a whole tile has the same data value written to the sampling positions for the tile in the tile buffer, without necessarily also tracking which sampling positions have the data value being written to them.

In this embodiment, the comparing and tracking of the data values in the rendered fragment data as that data is being written to the tile buffer for a tile is in an embodiment stopped when it is detected that a data value in the rendered fragment data being written to a sampling position in the tile buffer is different from the particular data value or values that are being tracked.

In an embodiment, it is tracked for sampling positions, and in an embodiment for each sampling position (and/or for sets of sampling positions), whether a particular data value or values (or set or sets of data values) has been written to the sampling position or not. This may, and in an embodiment does, operate in a similar manner to the way that the writing or not of rendered fragment data to the tile buffer for a sampling position when rendering a tile is tracked, e.g., and in an embodiment, such that a set of information, such as, and in an embodiment, a bitmap, is maintained, in which it is recorded, e.g. and in an embodiment for each sampling position, whether the data value(s) written to that sampling position corresponds to a particular data value (or to one of a set of particular data values) or not. Again, such a set of information (e.g. bitmap) is in an embodiment then used (assessed) once the tile has been completely rendered, to identify those sampling positions in the tile to which the same particular data value (or set of data values) have been written.

In both these cases, the particular data value or set of data values that is tracked can comprise any suitable and desired data value or set of data values. For example, it could comprise a selected, e.g. predefined, data value or values such as a reference data value, such as a background colour value. Additionally or alternatively, the particular data value or values could, e.g., be a data value, such as, and in an embodiment the first data value, that is written to a sampling position for the tile when the tile is being rendered (or one of the data values that is written to the tile as the tile is being rendered). In this latter case therefore, it will be tracked to see which sampling positions have the same data (e.g. colour) value as another sampling position that has been written to the tile (as a data value or values that has previously been written to the tile buffer for a sampling position in the tile).

Whether a particular data value or values has been written to a sampling position can be tracked in any suitable and desired manner. In an embodiment, as a (and in an embodiment as each) data value is written to the tile buffer, that data value is compared to the particular data value or values being tracked, and the tracking information for the sampling position that the data value is being written to is updated (or not) accordingly. This will then allow the data values that are being written to the sampling positions to be tracked as they are written into the tile buffer.

When comparing data values, the data value(s) that a new data value to be written to the tile buffer is compared with is in an embodiment not read from the tile buffer, but is in an embodiment stored in other storage, such as a set of flipflops. Thus, the "comparison" data value(s) are in an embodiment stored locally to tile buffer write operation.

In these arrangements, where blocks of same data values that are actually written to the tile buffer are identified, then the same data value that is associated with the sampling positions in the block will be a data value that has actually been written to the tile buffer (i.e. a rendered fragment data value).

A separate "data value" tracking bitmap (e.g.) could be used for this purpose. However, in an embodiment, when a "clear bits" bitmap is defined and used to track the sampling positions within a tile that are not written to ("clear"), the "clear bits" bitmap may be, and is in an embodiment, used to track the data values of the rendered fragment data being written to the array of sampling positions for the tile, e.g., and in an embodiment, when it has been determined that all of the sampling positions in the block (e.g. tile) will have rendered fragment data written to them, i.e. that there will be no sampling positions in the tile that are "clear".

Thus in an embodiment it is determined if a block comprising a plurality of sampling positions in the tile will have rendered fragment data generated for each of the sampling positions in the block, e.g., and in an embodiment, that the block is completely covered with non-transparent primitives, and then, when such a block has been identified, a bitmap previously reserved for tracking the sampling positions within a tile that are not written to (that are "clear") is used to track a data value (or set of data values) in the rendered fragment data being written to sampling positions in the tile buffer for the block (e.g. tile).

Conveniently, the step of determining when a block is completely covered with non-transparent primitives may be performed during rasterising the primitives. Thus, in an embodiment, the rasterising process is operable to identify block(s) comprising a plurality of sampling positions within a tile for which graphics fragments have been generated for rendering for each of the plurality of sampling positions in the block.

For example, the rasterising process may set a flag when the whole of a tile is covered by non-transparent primitives. In response to this flag being set, the "clear bits" bitmap may then be repurposed to use it for tracking a data value (or set of data values) in the rendered fragment data being written to the sampling positions in the tile buffer for the tile (i.e. in the knowledge that fragments will be generated and rendered for each of the sampling positions in the tile (and thus accordingly that rendered fragment data will be written to every sampling position in the tile buffer for the tile)).

Once a block of sampling positions within a tile all having the same data value has been identified, based on the writing of rendered fragment data to the tile buffer for the sampling positions in the block, a header data block for the block of same data value sampling positions will be generated in the manner of the technology described herein and written to, e.g. external, memory.

The writing of the header data block to the memory may be triggered (caused) in any suitable and desired way.

In one embodiment, suitable write out circuitry is signalled when a block of sampling positions within a tile having the same associated data value is identified, to trigger the writing of the header data block for the block of same data value sampling positions to memory.

The same data value that is to be used for all the data positions (and that accordingly will be indicated in the header data block for the block of data positions in question) may be indicated and provided to the header data block generating and storing process in any suitable and desired manner. For example, the data value for the data positions may be read from the buffer, e.g. from the tile buffer, where the data position values are stored. Additionally or alternatively, the data value could otherwise be provided in any other suitable and desired manner.

The memory where the header data blocks (and the sub-block data, where required) is stored may comprise any suitable such memory and may be configured in any suitable and desired manner. For example, it may be an on-chip buffer or it may be an external memory (and, indeed, may be more likely to be an external memory). Similarly, it may be dedicated memory for this purpose or it may be part of a memory that is used for other data as well. In an embodiment, this data is stored in main memory of the overall data processing system.

In the case of a texture data array, the memory is in an embodiment a texture buffer of the graphics processing system (which buffer may, e.g., be on-chip, or in external memory, as desired). Similarly, in the case of a frame for the display, the memory is in an embodiment a frame buffer for the data (graphics) processing system and/or for the display that the graphics processing system's output is to be provided to.

The header data and the sub-blocks data is in an embodiment stored in the same physical memory, although this is not essential.

Other memory arrangements would, of course, be possible.

Although the technology described herein has been described above with particular reference to the storing of the data for the data array, as will be appreciated by those skilled in the art, the technology described herein also extends to the corresponding process of reading (and decoding) data that has been stored in the manner of the technology described herein.

Thus, a further embodiment of the technology described herein comprises a method of determining a data value to use for a data position of a stored data array in a data processing system, the method comprising:
  reading a stored header data block for a block of the data array that the data position falls within;
  determining whether the header data block contains an indication that the value of all the data positions for the block of the data array have the same data value;
  and, when it is determined from the header data block that all of the data positions of the stored data array for the block of the data array that the header data block relates to have the same data value:
    determining from other data stored in the header data block the value to use for the data position.

A further embodiment of the technology described herein comprises an apparatus for determining a data value to use for a data position of a stored data array in a data processing system, the apparatus comprising processing circuitry configured to:
  read a stored header data block for a block of the data array that the data position falls within;
  determine whether the header data block contains an indication that the value of all the data positions for the block of the data array have the same data value;
  and, when it is determined from the header data block that all of the data positions of the stored data array for the block of the data array that the header data block relates to have the same data value:
    determine from other data stored in the header data block the value to use for the data position.

As will be appreciated by those skilled in the art, these embodiments of the technology described herein can, and in an embodiment do, include any one or more or all of the optional features of the technology described herein described herein, as appropriate.

Thus, for example, the data processing system is in an embodiment a graphics processing system or a display controller system, and the data array is in an embodiment a graphics texture (in which case the data position (element) is in an embodiment a texel), or a frame for display (in a frame buffer) (in which case the data position (element) is in an embodiment a pixel or a sampling position), etc. Similarly, the apparatus for determining the value of a data position of a stored data array in a data processing system is in an embodiment incorporated in a graphics processor or a display controller.

Correspondingly, the memory location of a stored header data block for the block of the data array that the data position falls within is in an embodiment determined, in an embodiment in a predetermined manner, in an embodiment from the relative position of the data position within the data array.

Similarly, the decoding process and system is in an embodiment configured to recognise particular, in an embodiment predefined, data values (e.g. sub-block size values) in a header data block, e.g., and in an embodiment in particular, in an embodiment predefined, data positions in a header data block, as indicating that all the data positions in the block of the data array that the header data block relates to have the same data value (and to then determine the value of the data position(s) accordingly).

The data value to use for the data position in question can be determined from other data stored in the header data block in any suitable and desired manner. This will depend upon how that value has been indicated and encoded in the header data block. Thus, for example, it may simply comprise reading the data value from the header data block, or it may comprise decoding (e.g. decompressing) data that is stored in the header data block to derive the data value itself.

In the case that the header data block does not contain an indication that the value of all the data positions for the block of the data array have the same data value, then the data value for the data position in question can be, and is in an embodiment, determined in the appropriate manner for the encoding scheme being used, e.g., and in an embodiment, in a manner that is in accordance with the techniques described in the Applicant's earlier US patents discussed above.

Once the value to use for the data position has been determined, then that data value can be used in any appropriate and desired manner, e.g., and in an embodiment, in dependence upon what the data array represents. Thus, for example, where the data array represents a graphics texture, the data value is in an embodiment used to apply a texture value to graphics fragments (e.g. sampling positions) being rendered. Correspondingly, where the data array is an output frame, e.g., for display, the data value for the data position is in an embodiment stored for the corresponding data position in the frame, which frame may then, e.g., be displayed.

As discussed above, in an embodiment of the technology described herein at least, the header data blocks include pointer data indicating a base (e.g. start) memory location for data for the set of sub-blocks that the header corresponds to, in an embodiment in the form of an offset (and in an embodiment in bytes) from the start in memory of a header buffer for the data array in question where the header data blocks are stored to the start in memory of the stored set of sub-blocks (the data for the set of sub-blocks) that the header data block in question relates to.

While it would be possible for this base memory location pointer data to be provided as integer numbers (using an integer number representation), the Applicants have further recognised that while using integer representations (formats) for this pointer data may suffice for most data arrays that need to be encoded, there can be situations where a much larger address span than can be indicated with an integer number format for the base address pointer may be required.

Thus, in an embodiment, the base memory location pointer data is indicated using floating point numbers (using a floating point number representation). For example, where a 32 bit field is used for this data, in an embodiment a floating point representation having a 5 bit exponent and a 27 bit mantissa is used. This will then facilitate, for example, indicating a much larger memory address range. This can then facilitate the pointer data (e.g. offsets) being used to address a much larger address span than would be the case, e.g., if simply using corresponding integer representations (integer values) for these values.

This may be particularly useful in the case where a graphics processor is able to use (and using) "sparse" ("partially resident") textures, i.e. in situations where a texture is so large that whole (entire) texture cannot be stored in memory once (or it is not desired to store the entire texture memory once), but instead smaller regions, such as tiles, of the texture are loaded and unloaded into and out of memory as desired.

In such arrangements, the "sparse" texture will typically use virtual addresses and can be very large, covering a much larger range of memory address space. Using a floating point representation for the base memory location address pointers will facilitate accessing a larger range of virtual addresses that may be used for "sparse" textures, but whilst still allowing tighter packing (pointer compression) when there is no requirement for a large address span.

It is believed that such an arrangement may be new and advantageous in its own right, thus a further embodiment of the technology described herein there is provided a method of storing an array of data in a data processing system, the array of data comprising a plurality of data positions, in which:

the array of data to be stored is divided into a plurality of blocks, each block comprising a plurality of data positions of the array of data;
each respective block of the data array is divided into a plurality of sub-blocks, each sub-block comprising a plurality of data positions of the array of data; and
data representing sub-blocks of the data array stored in memory, and, for each respective block that the data array has been divided into, a header data block containing data relating to the sub-blocks for the block of the data array that the header data block relates to is stored;
the method comprising:
for at least one block that the data array has been divided into:
storing data representing sub-blocks of that block of the data array; and
storing in the header data block for that block of the data array pointer data indicating a memory location for the stored data representing the sub-blocks that the header data block relates to, wherein the pointer data indicating a memory location for the stored data representing the sub-blocks is stored using a floating point number representation.

A further embodiment of the technology described herein there is provided an apparatus for storing an array of data in a data processing system, the array of data comprising a plurality of data positions, the apparatus comprising processing circuitry configured to:

divide an array of data to be stored into a plurality of blocks, each block comprising a plurality of data positions of the array of data;
divide each respective block of the data array into a plurality of sub-blocks, each sub-block comprising a plurality of data positions of the array of data;
store data representing sub-blocks of the data array in memory; and
store, for each respective block that the data array has been divided into, a header data block containing data relating to the sub-blocks for the block of the data array that the header data block relates to;
wherein the processing circuitry is further configured to be operable to store:
for a block that the data array has been divided into:
data representing sub-blocks of that block of the data array; and
store in the header data block for that block of the data array pointer data indicating a memory location for the stored data representing the sub-blocks that the header data block relates to, wherein the pointer data indicating a memory location for the stored data representing the sub-blocks is stored using a floating point number representation.

These embodiments of the technology described herein can, and in an embodiment do, include any one or more or all of the features of the technology described herein. Thus, for example, the header data block in an embodiment includes data indicating a size (in memory) for the data for some or all, and in an embodiment for each, of the sub-blocks in the set of sub-blocks that the header data block relates to, as well as the pointer data indicating a base memory location for the data for the set of sub-blocks that the header data block corresponds to. Similarly, the pointer data indicating a base memory location for the data for the set of sub-blocks that the header data block corresponds to is in an embodiment stored in a particular, in an embodiment predefined, position (field) in the header data block, and in an embodiment comprises a 32 bit floating point representation have a 5 bit exponent and a 27 bit mantissa.

The technology described herein also extends to a method and system that both stores and then reads the data for the data array in the manners discussed above.

The methods and apparatus of the technology described herein can be implemented in any appropriate manner, e.g. in dedicated hardware or programmable hardware, and in (and be included in) any appropriate device or component.

The actual device or component which is used to store the data in the manner of the technology described herein will, for example, depend upon the nature of the data array that is being stored. Thus, for example, in the case of a graphics texture, an appropriate processor, such as a personal computer, may be used to generate and store the textures in the manner of the technology described herein, e.g. by an application developer, and the so-stored textures then provided as part of the content of a game, for example. In the case of the stored data array being a frame for display, then it may accordingly be a graphics processor that generates and stores the data in the manner required.

Similarly, on the data reading (decoding) side of the operation, in the case of texture data, for example, it will be a graphics processor that reads (decodes) the stored data array, and in the case of a frame for display, it could be a display controller for a display that reads (decodes) the stored data array.

The data processing system of the technology described herein can be any suitable and desired data processing system and can contain any suitable and desired components, elements, etc. Thus, for example, the data processing system may, and in an embodiment does, comprise any one or more or all of: a CPU, a graphics processor, a video processor, a display controller, and/or an image signal processor.

The data processing system in an embodiment also has and/or is in communication with a display for displaying images generated by components of the data processing system, such as by a graphics processor, etc.

Thus the data processing system should (and in an embodiment does) produce some useful output data, e.g. graphics processing output data for use in (subsequent) graphics processing operations etc. In an embodiment, the generated output data is used to provide an image for display, e.g. is provided to a display for display.

In an embodiment, the data processing system comprises, and/or is in communication with, one or more memories and/or memory devices that store the data described herein, and/or that store software for performing the processes described herein.

In an embodiment, the technology described herein is implemented in a graphics processor, a display controller, an image signal processor, a video decoder or a video encoder and thus the technology described herein also extends to a graphics processor, a display controller, an image signal processor, a video decoder or a video encoder configured to use the methods of the technology described herein, or that includes the apparatus of the technology described herein, or that is operated in accordance with the method of any one or more of the embodiments of the technology described herein.

Subject to any hardware necessary to carry out the specific functions discussed above, such a graphics processor, display controller, image signal processor, video decoder or video encoder can otherwise include any one or more or all of the usual functional units, etc., that graphics processors, display controllers, image signal processors, video decoders or video encoders include. In an embodiment, the methods and apparatus of the technology described herein are implemented in hardware, in an embodiment on a single semiconductor platform.

The technology described herein is particularly, but not exclusively, suitable for use in low power and portable devices. Thus, in an embodiment, the technology described herein is implemented in a portable device, such as a mobile telephone or tablet.

The technology described herein can be implemented in any suitable system, such as a suitably configured microprocessor based system. In an embodiment, the technology described herein is implemented in computer and/or microprocessor based system.

The various functions of the technology described herein can be carried out in any desired and suitable manner. For example, the functions of the technology described herein can be implemented in hardware or software, as desired. Thus, for example, the various functional elements, stages, etc., of the technology described herein may comprise a suitable processor or processors, controller or controllers, functional units, circuitry, processing logic, microprocessor arrangements, etc., that are operable to perform the various functions, etc., such as appropriately dedicated hardware elements (processing circuitry) and/or programmable hardware elements (processing circuitry) that can be programmed to operate in the desired manner.

It should also be noted here that, as will be appreciated by those skilled in the art, the various functions, etc., of the technology described herein may be duplicated and/or carried out in parallel on a given processor and/or share processing circuitry.

Furthermore, any one or more or all of the processing stages of the technology described herein may be embodied as processing stage circuitry, e.g., in the form of one or more fixed-function units (hardware) (processing circuitry), and/or in the form of programmable processing circuitry that can be programmed to perform the desired operation. Equally, any one or more of the processing stages and processing stage circuitry of the technology described herein may be provided as a separate circuit element to any one or more of the other processing stages or processing stage circuitry, and/or any one or more or all of the processing stages and processing stage circuitry may be at least partially formed of shared processing circuitry.

It will also be appreciated by those skilled in the art that all of the described embodiments of the technology described herein can include, as appropriate, any one or more or all of the optional features of the technology described herein, as desired.

The methods in accordance with the technology described herein may be implemented at least partially using software e.g. computer programs. It will thus be seen that further embodiments of the technology described herein comprise computer software specifically adapted to carry out the methods herein described when installed on a data processor(s), a computer program element comprising computer software code portions for performing the methods herein described when the program element is run on a data processor(s), and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or other system comprising a data processor(s) causes in conjunction with said data processor(s) said processor, renderer or system to carry out the steps of the methods of the technology described herein. Such a computer software carrier could be a physical storage medium such as a ROM chip, RAM, flash memory, CD ROM or disk.

It will further be appreciated that not all steps of the methods of the technology described herein need be carried out by computer software and thus further broad embodiments of the technology described herein comprise computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory or hard disk. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre loaded with a computer system, for example, on a system ROM or fixed disk, or distributed from a server or electronic bulletin board over a network, for example, the Internet or World Wide Web.

A number of embodiments of the technology described herein will now be described.

FIG. 1 shows schematically the way that an array of original data 20 is stored in a first embodiment of the technology described herein.

The array of original data 20 is a two-dimensional data array containing a plurality of data elements (containing data entries at a plurality of particular positions within the array). The data array 20 could be any suitable and desired array of data, but in a graphics processing context, it could, for example, be a texture map (i.e. an array of texture elements (texels)), or an array of data representing a frame to be displayed (in which case the data array may be an array of pixels to be displayed). In the case of a texture map, each data entry (position) in the data array will represent an appropriate texel value (e.g. a set of colour values, such as RGBa, or luminance and chrominance, values for the texel). In the case of a frame for display, each data entry (position) in the array will indicate a set of colour values (e.g. RBG values) to be used for displaying the frame on a display.

As shown in FIG. 1, to store the data array 20 in memory, the data array 20 is first divided into a plurality of non-overlapping, equal-size and uniform blocks 21, each block corresponding to a particular region of the data array 20. In the present embodiment, each block 21 of the data array corresponds to a block of 16×16 elements (positions) within the data array 20 (i.e. a block of 16×16 texels in the case of a texture map). Other arrangements would, of course, be possible.

Each block 21 that the data array 20 is divided into is further sub-divided into a set of sixteen non-overlapping, uniform and equal-size sub-blocks 22. In the present case, as each block 21 corresponds to 16×16 elements (positions) within the data array, each sub-block 22 accordingly corresponds to a 4×4 data element region within the block 21 (e.g. 4×4 texels in the case of a texture map). (FIG. 1 only shows the division of a few of the blocks 21 of the data array 20 into sub-blocks for simplicity. However, each and every block 21 that the original data array 20 is divided into is correspondingly sub-divided into a set of plural sub-blocks 22.)

To store the data array 20 in memory, firstly a header data block 23 is stored for each block 21 that the data array 20 has been divided into. These header data blocks are stored in a header buffer 24 in memory. The header buffer 24 starts at a start address A in memory, and the header data blocks 23 are each stored at a predictable memory address within the header buffer 24.

FIG. 1 shows the positions of the header data blocks 23 in the header buffer 24 for some of the blocks 21 that the data array 20 is divided into. Each block 21 that the data array 20 is divided into has a corresponding header data block 23 in the header buffer 24.

The position that each header data block 23 is stored at within the header buffer 24 is determined from (predicted from) the position within the data array of the block 21 that the header data block 23 relates to. In particular, the address of the header data block 21 in the header buffer 24 for a data array element (e.g. texel or pixel) at a position x, y within the data array 20 is given by:

$$\text{header data block address} = A + 32*(x/16 + (y*\text{xsize})/16)$$

where A is the start address of the header buffer, xsize and ysize are the vertical and horizontal dimensions, respectively, of the data array 20, and it is assumed that the data array 20 is divided into 16×16 blocks and each header data block occupies 32 bytes.

In the present embodiment, each header data block 23 in the header buffer 24 has the same, fixed size, based on the burst-size, such as 64-bytes, used by the data processing system in which the stored data array is to be used. This means that the header data blocks 23 are of a size that can be fetched using a system-friendly burst size.

As well as storing a respective header data block 23 in the header buffer 24 for each block 21 that the original data 20 is divided into, the data storage arrangement of the present embodiment is also able to store data for each sub-block 22 that a given data block is divided into. This sub-block data is stored in memory in sub-block storage or body blocks 25, which comprise in the present embodiment aligned blocks of 1024 bytes. (Having the body blocks storing the sub-block data in 1024 byte sub-block storage blocks provides the ability to encode the data array with several different encoders in parallel, by each encoder allocating a new body block 25 through a central repository every time it runs out of space.) In the present embodiment, the body blocks 25 are stored directly after the header buffer 24 (but may appear in random order there). This allows the pointer data in the header data blocks to be in the form of offsets from the start or end of the header buffer 24. (This is not essential, and the body blocks 25 may reside anywhere in memory, if desired.)

The sets of data 26 for each respective set of sub-blocks are stored in the body blocks one after another, as shown in FIG. 1. This has the effect then that the data for a set of sub-blocks 22 for a given 16×16 block 21 can span two different body blocks 25 (as shown in FIG. 1 for the set 27 of sub-block data).

Figure 2:
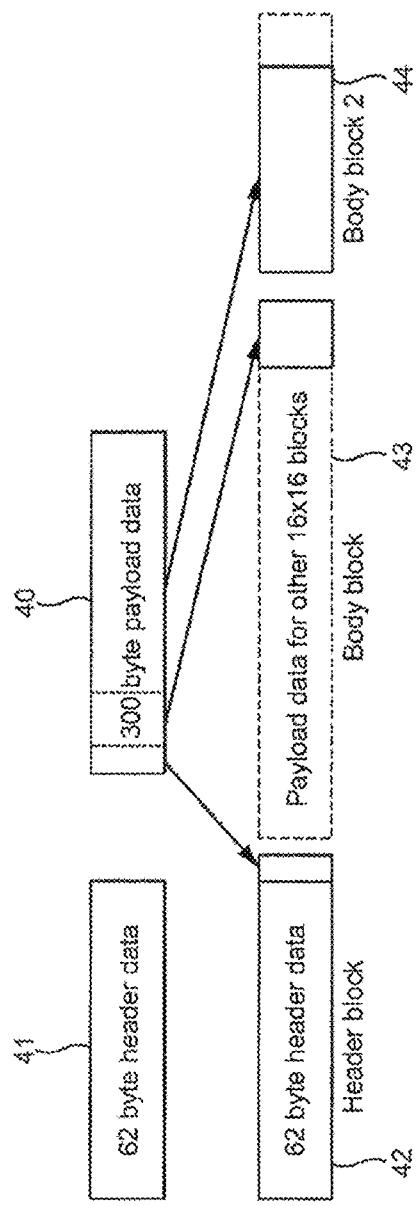
FIG. 2 shows schematically the distribution of data for a block of a data array between a header data block and body blocks in memory in a first embodiment of the technology described herein.

FIG. 2 shows this in more detail. If it is assumed that the "payload" data 40 to be stored for the set of 4×4 sub-blocks corresponding to a given 16×16 block of the data array comprises 300 bytes, and the header data 41 to be stored for the block comprises 62 bytes, as shown in FIG. 2, then if the header block 42 has a capacity of 64 bytes, the first two bytes of "payload" data will be stored in the header block, and then the remaining bytes of payload data distributed between one or two body blocks 43, 44 (depending upon the available space in the first body block). (Typically, the sub-block "payload" data will be stored in the header block and 0-2 body blocks, depending on the amount of that data and the available capacity in the respective header and body blocks.)

The header buffer 24 and body blocks 25 may be stored in any suitable memory of the data processing system in question. Thus, for example, they may be stored in an on-chip memory or in an external memory, such as a main memory of the data processing system. They are in an embodiment stored in the same physical memory, but that is not essential.

Some or all of the header buffer and body blocks could also be copied to a local memory (e.g. cached), in use, if desired.

The data that is stored for each sub-block in the body blocks 25 could simply comprise the data in the data array 20 for the corresponding data elements (entries) that the sub-block corresponds to. However, in the present embodiment, rather than storing the data array 20 in its full, original form, each data array sub-block 22 is encoded to give an encoded representation of the original data that has a reduced size as compared to the data in its original, unencoded form. This compresses the original data, thereby making its storage and processing more efficient. Any suitable and desired encoding (compression) process can be used for this encoding.

Thus, in the present embodiment, the original data array 20 is encoded and compressed, before it is stored, so the data that is stored in respect of each sub-block 22 will be data that can be appropriately decoded to derive the data entries for the original data array. In other words, the data that is stored in respect of each sub-block 22 will be data from which the original data elements (or at least a desired approximation to the value of those data elements (e.g. where a lossy encoding (compression) scheme is being used)) can be derived. It will be data that can be used to determine the values of the data elements in the original data array (or at least desired approximations to those original data values) for the data elements in the sub-block in question.

Each header data block contains pointer data indicating the position within a body block 25 where the data for the sub-blocks for the block 21 that that header data block 23 relates to is stored. In the case where the sub-block data for a given data block spans two different body blocks (as illustrated in FIG. 1), the header data block 23 will contain a second pointer to indicate the position of the second body block in which the data for the set of sub-blocks is stored. In the present embodiment, this pointer comprises the upper 22 bits of a 1024 byte aligned address. (In the present embodiment, each header data block contains pointers to both a first and a second body block, irrespective of whether a given block's sub-block data will extend into a second body block. This is to allow for the fact that when the encoding process is started, it may not be known before the data is written to memory whether a second body block will be used or not.)

In the present embodiment, the pointer data in the header data blocks 23 indicates the start position 28 in the body block 25 in memory of the stored data 26 for the respective sub-blocks that the header data block relates to. In order to locate the data for the individual 4×4 sub-blocks, it is accordingly necessary for the decoder to be able to determine the location of the data for the individual 4×4 sub-blocks within the overall set of data 26 for the sub-blocks in question. This is achieved in the present embodiment by including in the header data block 23 the memory size used to store the data for each respective 4×4 sub-block (in bytes).

To locate the data for an individual 4×4 sub-block in a body block 25, the decoder then accordingly uses the pointer in the header data block 23 to determine the start position 28 of the data 26 for the set of sixteen 4×4 sub-blocks that the header data block 23 relates to in the body block 25, and then uses the size information in the header data block 23 to sum the sizes of the stored data for the 4×4 sub-blocks that are stored prior to the 4×4 sub-block of interest, to determine the start position for the data in the body block 25 for the sub-block of interest. The end position of the data for the sub-block of interest is correspondingly determined using the indicated stored data size for the sub-block in question.

Including the sub-block size information in the header data blocks avoids the need to have to read multiple different places in memory in order to identify the memory location of the desired sub-block data.

In the present embodiment, if there are some sizes of stored sub-block data that can be indicated by the size fields in the header data blocks, but which sizes will not in fact occur in use (e.g. because they are impossible to achieve with the compression or encoding scheme that is being used), then those size values are predefined as indicating special cases, such as an uncompressed data block or a one colour block. This facilitates signalling such special cases to the decoder in an efficient manner.

If, after the pointer and sub-block size data has been included in a header data block 23, there is any remaining space in the header data block, then rather than leaving that space unused, it is filled with further useful information, such as, and in particular, data that will be needed to, or that can be used to, determine the values of data elements for the sub-blocks to which the header data block relates (i.e. data to be used to decode the sub-blocks data).

For example, part of the encoded (e.g. compressed) data representing the original data array that is to be used for all of the sub-blocks that the header data block relates to for the decoding process could be included in the "spare" space in the header data block. It would also be possible to include in the header data block data that is specific to a given sub-block if there is any remaining space in the header data block after the data to be used in common by (shared by) all the sub-blocks that the header data block relates to has been included in the header data block. Filling the header data blocks with other useful data such as this means that the header data blocks can be of a size that can be fetched using a system-friendly burst size, without wasting memory space.

In the present embodiment, 32-byte header data blocks are used, and the layout of the header data block is typically a 1 byte exact pointer to a body block (sub-block storage block), occupying e.g. 32 bits, one body block size-aligned pointer to a second body block (which can be 22 bits, as discussed above), 16 sets of sub-block size data (each typically occupying 6-bits), with the rest of the header data block filled with encoded sub-block data.

Figure 3:
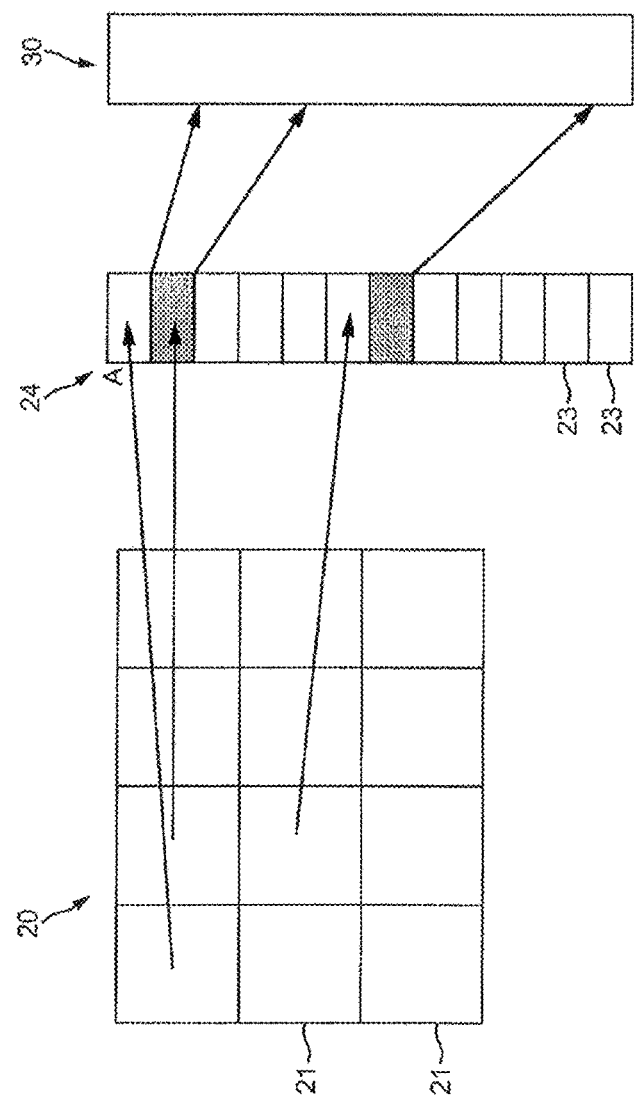
FIG. 3 shows schematically the storing of an array of data in accordance with further embodiments of the technology described herein.

FIG. 3 shows schematically the way that an array of original data 20 is stored in other embodiments of the technology described herein.

The storage arrangement in these embodiments and illustrated in FIG. 3 is similar in many respects to the arrangement described above with reference to FIGS. 1 and 2. The following description will therefore focus on the differences between the two arrangements.

As in the embodiment described above, in these embodiments, as shown in FIG. 3, a data array 20 to be stored is divided into a plurality of non-overlapping, equal-size and uniform blocks 21, each block corresponding to a particular region of the data array 20. Again, in these embodiments, each block 21 of the data array corresponds to a block of 16×16 elements (positions) within the data array 20 (i.e. a block of 16×16 texels in the case of a texture map).

Each block 21 that the data array 20 is divided into is then further sub-divided into uniform and equal-size sub-blocks 22 (not shown), each corresponding to a 4×4 data element region within the block 21 (e.g. 4×4 texels in the case of a texture map).

Similarly, to store the data array 20 in memory, a header data block 23 is stored in a header buffer 24 for each block 21 that the data array 20 has been divided into. Again, the header buffer 24 starts at a start address A in memory, and the header data blocks 23 are each stored at a predictable memory address within the header buffer 24.

In these embodiments of the technology described herein each header data block is configured to occupy only 16 bytes (and, as will be discussed further below, to contain only pointer data to the relevant sub-blocks' data). This again means that the header data blocks 23 are of a size that can be fetched using a system-friendly burst size.

The position that each header data block 23 is stored at within the header buffer 24 is again determined from (predicted from) the position within the data array of the block 21 that the header data block 23 relates to. In these embodiments, the address of the header data block 21 in the header buffer 24 for a data array element (e.g. texel or pixel) at a position x, y within the data array 20 is given by:

$$\text{header data block address} = A + 16*(x/16 + (y*\text{xsize})/16)$$

where A is the start address of the header buffer, xsize and ysize are the vertical and horizontal dimensions, respectively, of the data array 20 (and it is assumed that the data array 20 is divided into 16×16 blocks and each header data block occupies 16 bytes).

As well as storing a respective header data block 23 in the header buffer 24 for each block 21 that the original data array 20 is divided into, the data storage arrangements of the present embodiments also store data for each sub-block 22 that a given data block is divided into in a body buffer 30. However, in these embodiments, as shown in FIG. 3, the sub-blocks' data is simply stored in a continuous fashion in the body buffer 30 (i.e. the body buffer 30 is not divided into separate aligned "body blocks").

The body buffer 30 is stored after the header buffer 24. This allows the pointer data in the header data blocks to be in the form of offsets from the start or end of the header buffer 24. (Again, this is not essential, and the body buffer 30 may reside anywhere in memory, if desired.)

The header buffer 24 and body buffer 30 may again be stored in any suitable memory of the data processing system in question. Thus, for example, they may be stored in an on-chip memory or in an external memory, such as a main memory of the data processing system. They are in an embodiment stored in the same physical memory, but that is not essential. Some or all of the header buffer and body buffer could also be copied to a local memory (e.g. cached), in use, if desired.

The data that is stored for the sub-blocks in the body buffer 30 again can comprise the data in the data array 20 in an uncompressed or in a compressed (encoded) form. In an embodiment, the sub-block data is encoded to give an encoded representation of the original data that has a reduced size as compared to the data in its original, unencoded form. Any suitable and desired encoding (compression) process can be used for this encoding.

Each header data block 23 in this embodiment again contains pointer data indicating the position within the body buffer 30 where the data for the sub-blocks for the block 21 that that header data block 23 relates to is stored.

In these embodiments, the pointer data in the header data blocks 23 indicates the start position in the body buffer 30 of the stored data for the respective sub-blocks that the header data block relates to, in the form of an offset from the start location A of the header buffer 24, together with a "size" indication value (in bytes) for each sub-block that the block that the header data block relates to has been divided into (encoded as).

(Thus, as before, to locate the data for an individual sub-block in the body buffer 30, the decoder will use the pointer in the header data block 23 to determine the start position in the body buffer 30 of the data for the set of sub-blocks that the header data block 23 relates to, and then use the size information in the header data block 23 to sum the sizes of the stored data for the sub-blocks that are stored prior to the sub-block of interest, to determine the start position for the data in the body buffer 30 for the sub-block of interest. The end position of the data for the sub-block of interest is correspondingly determined using the indicated stored data size for the sub-block in question.)

In these embodiments, the header data blocks 23 are configured to contain only (to store only) the indication of the start position of the body buffer 30 of the stored data for the respective sub-blocks that the header data block relates to and the respective size indication values for each sub-block that the header data block relates to. Thus, unlike in the previous embodiment, the header data blocks do not store any "payload" sub-block data (i.e. any data that is to be used when decoding a given sub-block). This has the advantage that only the sub-block data and not any data that is in the header data block needs to be decoded when decoding a given sub-block.

When encoding with multiple different encoders, the encoding processes in these embodiments are configured to make sure that each encoder before it starts encoding has access to a continuous set of memory space that is the size of an uncompressed block of the data array 20. This is achieved by dividing the body buffer 30 into as many different parts as there are encoders available, and allocating each encoder one of the respective parts of the body buffer 30. Then when one encoder has filled its own buffer part to the point where there is not enough memory space available to guarantee that an encoded block of the data array will fit in the allocated space, the encoder is configured to take half of the space allocated for another encoder (rounded to the size of the uncompressed body buffer) and to then carry on its compression. As long as the granularity of the allocated body buffer parts is as big as the maximum size that an encoded block of the data array can occupy, this should not require any extra data.

In these embodiments, certain sub-block size indication values that can be indicated by the size fields in the header data blocks 23 are predefined as (set aside for) indicating special cases of sub-block, so as to facilitate signalling such special cases to the decoder in an efficient manner. In the present embodiments, the size indication values that are used for this purpose are for sizes which will not in fact occur in use, namely size indications of 0 or 1.

A size indication value of 1 is used to indicate that the data for the sub-block to which the size indication value relates has been stored in an uncompressed form in the body buffer.

A size indication value of 0 is used to indicate that the same data as was used for the preceding sub-block should be used when decoding the sub-block to which the size indication value of 0 relates (i.e. the same data as was used for sub-block n−1 should be used when decoding the sub-block n to which the size indication value of 0 relates). This effectively can be used to indicate the situation where a given sub-block can be considered to be a copy of (and thus can be copied from when decoding) another sub-block.

Where such a copy sub-block is identified in the encoding process, then no data for the copy sub-block is stored in the body buffer 30. This can allow the sub-block data to be stored in a more compressed form in the body buffer 30, by avoiding the storage of duplicated sub-block data.

To further enhance the potential benefit of the use of a "copy" sub-block size value indication, in these embodiments the sub-blocks for a given block of the data array are encoded and stored in an order that follows a space filling curve, such as a Peano curve, U-order, Z-order, etc., so as to ensure that each sub-block is always encoded (stored) next to a spatially near neighbour sub-block. This can also help to enhance the benefits of caching of any sub-block data.

In the present embodiments, as discussed above, 16-byte header blocks which contain a pointer to the start of the sub-block data in the body buffer 30 together with a size indication value for each sub-block, are used. The basic layout of each header data block is for the pointer to the start of the set of sub-blocks' data for the block in question to come first, followed by size indication values for each respective sub-block (in the order that the sub-blocks are encoded and stored in the body buffer 30). The actual sizes of the pointer and size indication values and the layout of the sub-blocks in the body buffer 30 may, however, be configured differently, depending upon the form of the data that is being encoded (e.g. whether it is RGB or YUV data).

FIGS. 4-8 show the arrangement of a header data block and the sub-blocks' data for a respective block of the data array 20 when encoding and storing RGB or RGBA data.

FIGS. 4 and 5 show the arrangement for a block of a data array that does not contain any predefined "special case" sub-blocks.

Figure 6:
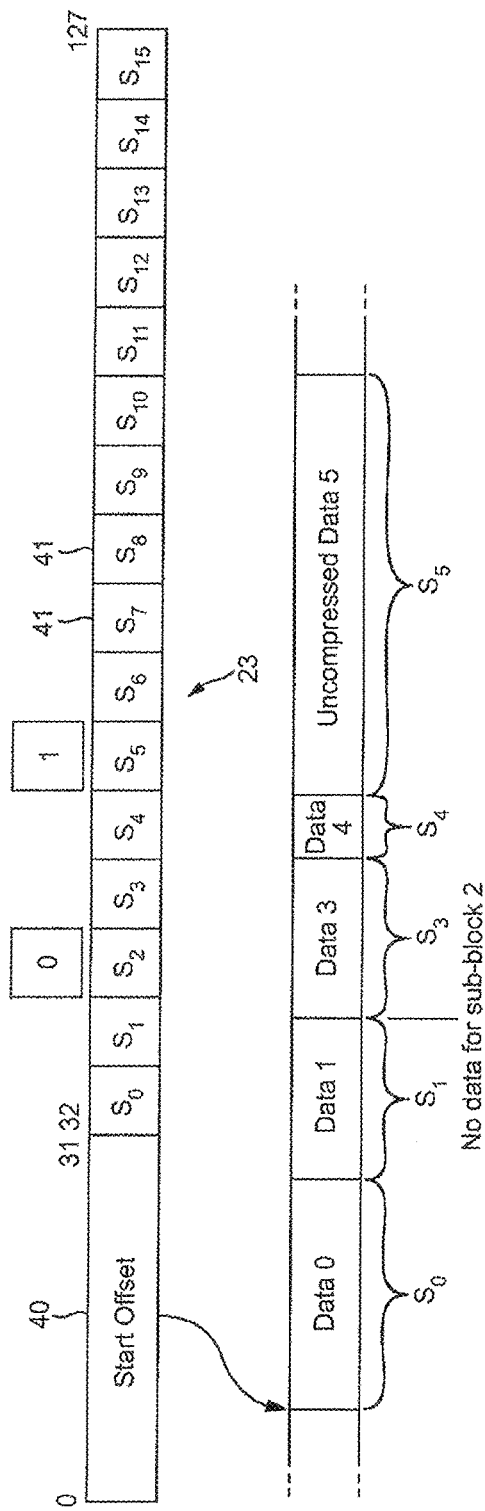
Figure 7:
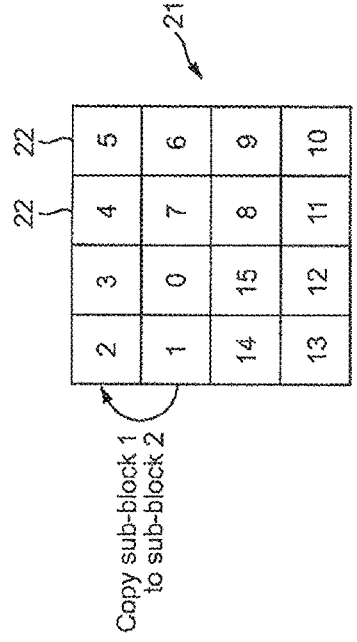
FIG. 7 shows schematically the order of the stored sub-block data in the embodiment of FIG. 6.

FIGS. 6 and 7 show the arrangement for a block of the data array that includes some predefined special case sub-blocks (namely a "copy" sub-block and an uncompressed sub-block).

Figure 8:
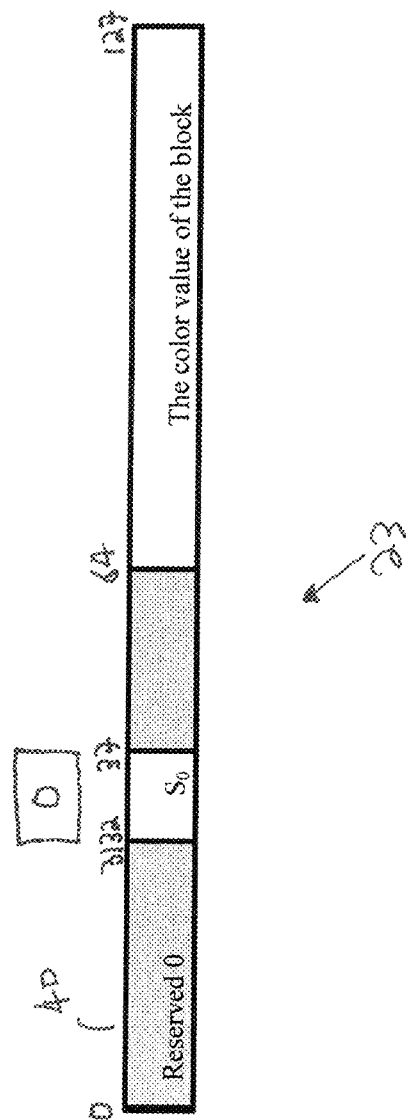
FIG. 8 shows schematically the arrangement of a header data block when it is determined that all the data positions of a data block have the same data value in an embodiment of the technology described herein.

FIG. 8 shows the header data block arrangement where all the data elements (positions) for the data array block in question have the same data value.

In these examples, where each block that the data array is divided into represents 16×16 data entries, then for RGB or RGBA data each block of the data array is divided into and encoded as 16 4×4 sub-blocks. Each sub-block will accordingly be stored as a three or four component texture.

As shown in FIGS. 4 and 5, the header data block 23 includes a 32 bit pointer 40 in the form of an offset to the start of the sub-block data for the data block in the body buffer 30, and then 16 6-bit size indication values 41, one for each sub-block that the block of the data array has been divided into for encoding purposes (as discussed above), thereby providing in total a 16-byte header data block. As shown in FIGS. 4 and 5, each size indication value in the header data block 23 indicates the memory size that has been used to store the data to be used to decode the respective sub-block in the body buffer 30 that the size indication value relates to.

The pointer 40 may, e.g., be stored as an integer value, or it may be stored (indicated) using a floating point representation, e.g. depending upon the size of the address space that it is desired to be able to indicate.

FIG. 5 shows the order that the 16 4×4 sub-blocks of the block of each data array are encoded and stored in. As can be seen from FIG. 5, the encoding order follows a space filling curve, in this case a Peano curve.

FIGS. 6 and 7 show the data storage arrangement for RGB or RGBA data for a block where it has been determined that the third sub-block (sub-block number 2) can be considered to be a copy of the second sub-block (sub-block number 1). In this case, the size indication value S2 for the third sub-block is set to the value "0" which has been predefined as indicating a copy sub-block, and as shown in FIGS. 6 and 7, no sub-block data is stored for the third sub-block (sub-block number 2) in the body buffer 30, but rather the data stored for the second sub-block (sub-block number 1) will be reused by the decoder to decode the third sub-block (sub-block number 2).

FIG. 6 also shows an exemplary uncompressed sub-block (sub-block 5), which accordingly has its size indication value S5 set to the value 1 that has been predefined as indicating an uncompressed sub-block.

FIG. 8 shows the arrangement of a header data block where all the data elements (positions) for the block in question have been determined to have the same data value associated with them.

In this case, as shown in FIG. 8, the size indication value the size indication value (field) S0 for the first sub-block of the block of data that the header data block 23 relates to in bits 37:32 of the header data block 23 is set to the value "0" which has been predefined as indicating a copy sub-block. However, in this case, the presence of the copy sub-block indication value "0" in that position in the header data block 23 is taken as an indication that all of the data elements (data positions) in the block of data that the header data block relates to have the same data value (colour value).

The same data value (colour value) to be used for all the data positions (data elements) of the block is then included in an uncompressed form in bits 127:64 of the header data block, as shown in FIG. 8.

The other data fields in the header data block, thus the 32 bit pointer indicating the offset to the start of the sub-block data and any remaining sub-block size indication fields are simply set, as shown in FIG. 8, to a default value, such as "0".

As is also shown in FIG. 8, in this case, there is no corresponding separate (additional) set of sub-blocks data that is stored, as all the information that is needed for decoding the block of data elements (data positions) is included in the header data block.

The above arrangements may be used for data where it is desired to store all the data components together in the same encoded sub-block. In other cases, such as for YUV data, different data components, such as the Y-plane data and the UV-plane data, may be stored as separate encoded sub-blocks, to facilitate reading and decoding that data separately, and also to allow for different types of data to be stored at different resolutions.

In operation to encode a data array 20 in the manner of the above embodiments, suitably configured and/or programmed processing circuitry will receive and/or fetch from memory a stream of data representing the original data array 20, and operate to divide the data array 20 into blocks and sub-blocks as discussed above, generate and store appropriate header data blocks, and generate encoded data for the sub-blocks of the data array and store the encoded data for the sub-blocks of the data array in memory. If necessary, padding data can be added to the input data array to ensure that it has a width and height evenly dividable by 16 (such padding data can then be appropriately cropped by the decoder when decoding the data array if required).

As part of the encoding operation, given blocks of the data array to be encoded will be assessed to determine if all the data elements (positions) of the block have the same data value, with such data blocks then being encoded using (only) a header data block of the form shown in FIG. 8.

Such blocks of same data positions may be identified, e.g., by reading the data values of all the data positions of the block of the data array from memory and comparing their data values to determine if they are the same.

In an embodiment, the identification of same data value blocks in the data array is determined as the blocks of the data array are being written to a buffer from where they are then stored (written out) to (main) memory. An embodiment of this operation in the context of a tile-based graphics processing system will now be described with reference to FIGS. 9-11.

Figure 9:
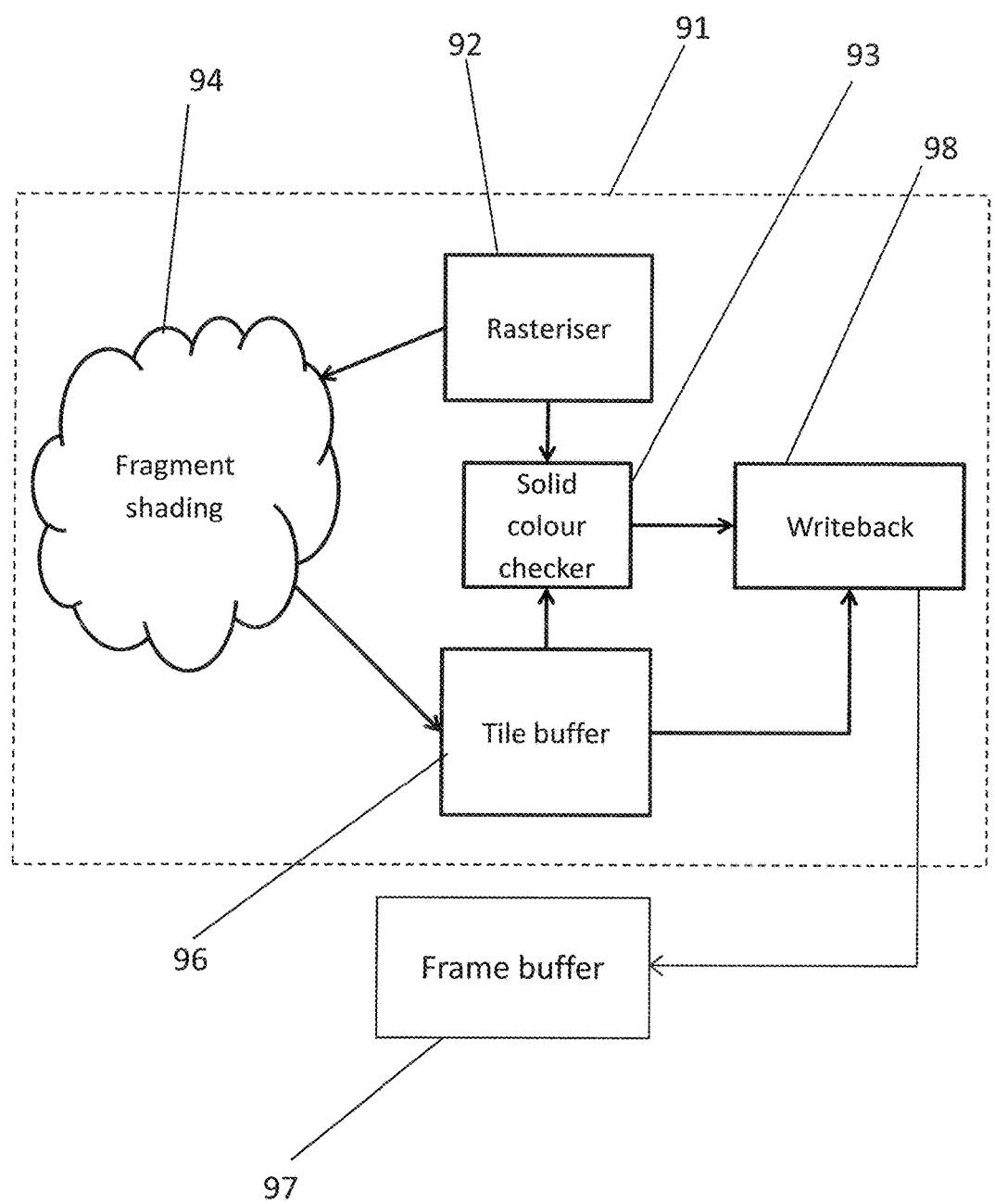
FIG. 9 shows a schematic of a tile-based graphics processing pipeline in accordance with an embodiment of the technology described herein.

FIG. 9 shows a schematic of a tile-based graphics processing pipeline 91 of this embodiment of the technology described herein. The pipeline 91 includes a rasteriser 92 for generating fragments to be rendered for sampling positions associated with primitives covering a tile, and a fragment shading stage 94 that receives the rasterised fragments from the rasteriser 92. The fragment shading stage 94 is configured to render the rasterised fragments, to generate rendered fragment data for the sampling positions associated with the fragments, e.g. to determine the rendered colour and transparency (e.g. RGBα) values for the sampling positions in the tile.

The pipeline 91 also includes a tile buffer 96 that is coupled to the fragment shading stage 94 to allow the rendered fragment data for sampling positions in a tile to be written to the tile buffer 96. The tile buffer 96 is also coupled, via a writeback unit 98, to a frame buffer 97 that is in main memory, i.e. external to the pipeline 91.

The writeback unit 98 is configured to write out a compressed representation of the rendered fragment data written to the tile buffer 96 for a tile to the frame buffer 97. The writeback unit 98 uses the compression scheme described above and in the Applicant's U.S. Pat. Nos. 8,542,939 B2, 9,014,496 B2, 8,990,518 B2 and 9,116,790 B2 to represent the rendered fragment data, when writing a compressed representation of the rendered fragment data in the tile buffer to the frame buffer 97. Thus, the compressed representation comprises a header data block associated with a block (e.g. tile) of sampling positions, and sub-block data associated with the block, as discussed above.

The pipeline 91 shown in FIG. 9, also includes a "solid colour checker" processing stage (processing circuitry) 93 for identifying blocks of constant colour in the tiles that are rendered. The solid colour checker 93 is coupled to the rasteriser 92 and the tile buffer 96 so that it can control the operation of the writeback unit 98 for writing data out to the frame buffer 97, as will be described below.

Figure 10:
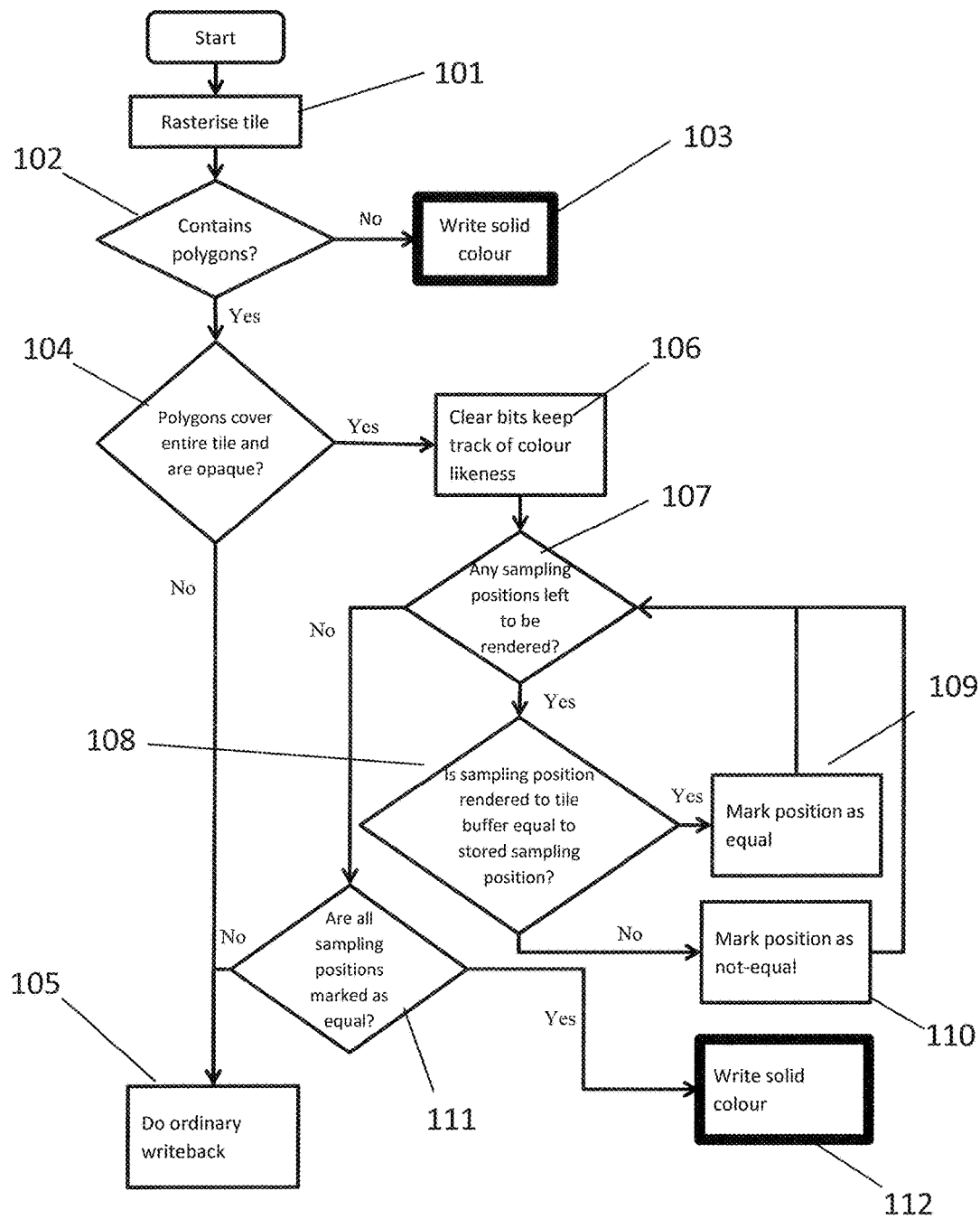
FIG. 10 shows a flowchart of the operation of the tile-based graphics processing pipeline shown in FIG. 9.
Figure 11:
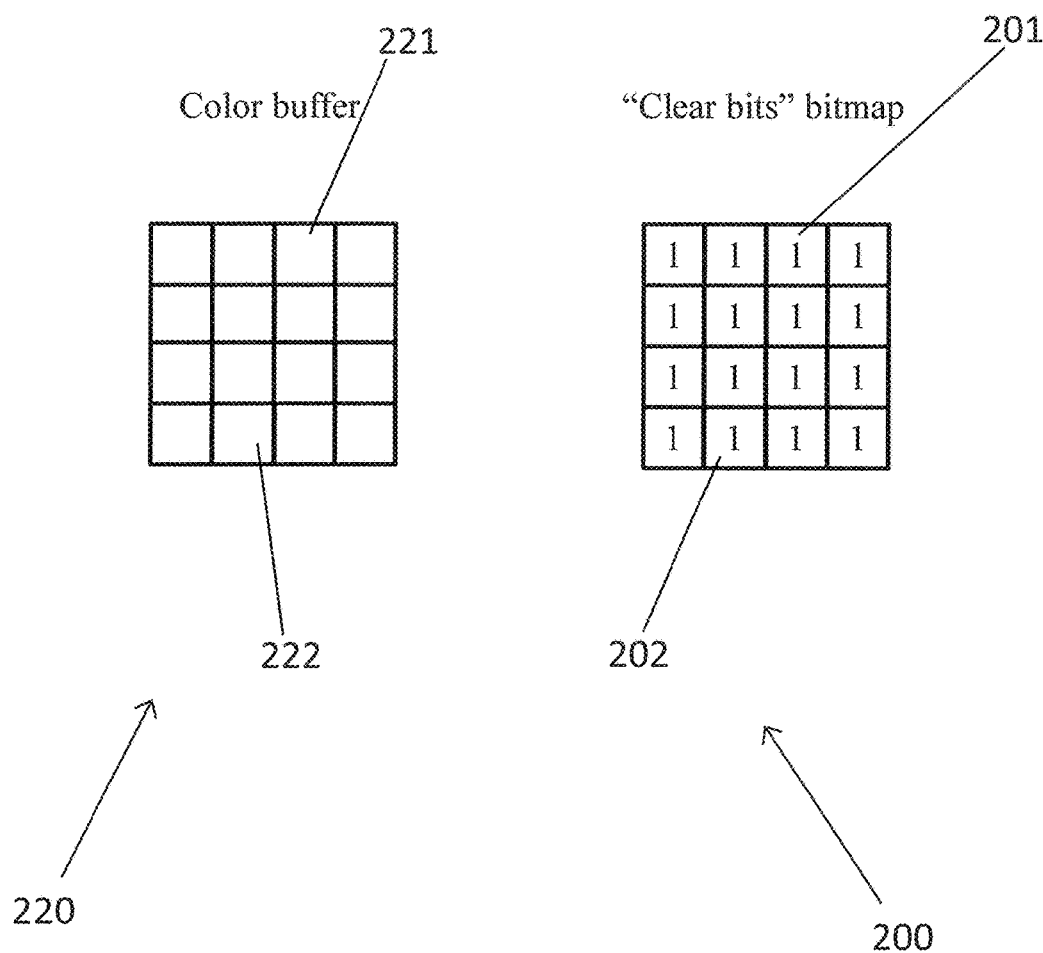
FIG. 11 shows an example of the use of a colour buffer and a "clear bits" bitmap for an example tile for use with the embodiment shown in FIGS. 9 and 10.

Operation of the pipeline 91 shown in FIG. 9 will now be described with reference to FIGS. 9, 10 and 11. FIG. 10 shows a flowchart of the operation of the tile-based graphics processing pipeline shown in FIG. 9, and FIG. 11 shows an example of the use of a colour buffer and a "clear bits" bitmap for an example tile for use with the embodiment shown in FIGS. 9 and 10.

Following the rasterising process (step 101, FIG. 10) by the rasteriser 92, and based on the fragments (if any) that are generated for a tile, the solid colour checker 93 determines if the tile contains any primitives (polygons) to be rendered (step 102, FIG. 10). When there are no primitives to be rendered for the tile (i.e. no primitives are even at least partially covering the tile) then no fragments will have been generated by the rasteriser 92 and thus the tile is completely "clear". This will also mean that there will be no fragments to be rendered by the fragment shading stage 94 and thus no rendered fragment data for any of the sampling positions in the tile will be written to the tile buffer 96.

Upon identifying this absence of primitives and fragments in the tile, the solid colour checker 93 signals to the writeback unit 98 that the tile will not be written to (i.e. it is completely "clear"). The writeback unit 98 then writes out a header data block of the form shown in FIG. 8 for the tile (to represent the tile in the stored data array that the tile is part of). In this case, the "same" colour value that is indicated in the header data block is the default colour value that is to be used for "clear" sampling positions.

Alternatively, the solid colour checker 93 will detect that the tile being rendered does contain primitives to be rendered (step 102, FIG. 10). In this case, fragments will have been generated by the rasteriser 92 for the tile and thus will be rendered by the fragment shading stage 94 to generated rendered fragment data that will be written to the tile buffer 96 for one or more sampling positions in the tile. The solid colour checker then determines, from a flag set by the rasteriser for the tile when the tile is completely covered by opaque primitives (i.e. if opaque primitives cover the entire tile) (step 104, FIG. 10).

When the tile is not completely covered by opaque primitives, i.e. there are one or more sampling positions in the tile that are either clear or translucent (e.g. having an alpha value of less than 1), then the fragments for the primitives in the tile are rendered by the fragment shading stage 94, with the rendered fragment data for the sampling positions associated with these fragments being written to the tile buffer 96. Once all the rendered fragment data for the tile has been written to the tile buffer 96, the writeback unit 98 writes out the rendered fragment data to the frame buffer 97 (step 105, FIG. 10), using the frame buffer compression technique described above (and as described in the Applicant's U.S. Pat. Nos. 8,542,939 B2, 9,014,496 B2, 8,990,518 B2 and 9,116,790 B2).

When the tile is completely covered by opaque primitives, then the fragments for the primitives in the tile are rendered by the fragment shading stage 94, with the rendered fragment data for the sampling positions associated with these fragments being written to the tile buffer 96.

Ordinarily, a "clear bits" bitmap 200 (as shown in FIG. 11) is used to identify the sampling positions in the tile to which no rendered fragment data is written in the tile buffer 96 (i.e. sampling positions that are "clear"). Tracking these "clear" sampling positions in the tile in this way may then allow a tile or block therein to be identified that has sampling positions in the tile to which no rendered fragment data is written in the tile buffer 96, e.g. if such a block or tile is not identified at the rasterising stage. However, once the solid colour checker 93 has determined that the entire tile is covered with opaque polygons (step 104, FIG. 10), it is known that the tracking of "clear" sampling positions in the tile is no longer needed. Thus the bitmap 200 can then be repurposed for use to compare the rendered colour of sampling positions as the rendered fragment data is written to the tile buffer 96.

Thus, as the rendered fragment data for the sampling positions is written to the tile buffer 96, the bitmap 200 is used to keep track of the sampling positions having associated with them rendered fragment data including a colour value that is the same, i.e. to track the sampling positions in the tile that have been rendered the same colour (step 106, FIG. 10).

FIG. 11 shows the use of the "clear bits" bitmap 200 to track the sampling positions in the tile that have been rendered the same colour (having been repurposed from tracking sampling positions to which no rendered fragment data is written in the tile buffer 96). FIG. 11 also shows a colour buffer 220 (as part of the tile buffer 96) showing the colour of the rendered fragment data for the sampling positions in the tile. (For the purposes of clarity the colours are shown in grayscale and the number of sampling positions in the tile is limited to 4×4. In practice any colours may be used and the tile may contain a larger number of sampling positions, e.g. 16×16 or 32×8.)

The solid colour checker 93 compares the colour value in the rendered fragment data as that data is written to sampling positions in the tile buffer 96 with the colour value in the rendered fragment data for the first sampling position written to the tile buffer 96 for the tile, i.e. to identify sampling positions to which rendered fragment data having the same colour value is being written to the tile buffer 96 (step 108, FIG. 10). The solid colour checker 93 then uses the clear bits bitmap 200 to track the sampling positions to which the same colour value has been written to the tile buffer 96.

The clear bits bitmap 200 is an array corresponding to the array of sampling positions in the tile having a bit at each position in the array. When being used to track the colour values being written to the tile, in this embodiment the bit for a sampling position is set to "1" when the colour value in the rendered fragment data for the sampling position is the same as the colour value for the first sampling position written to the tile buffer 96, or "0" when the colour value in the rendered fragment data for the sampling position is different to the colour value for the first sampling position written to the tile buffer 96.

The colour value in the rendered fragment data for the first written sampling position 221 is stored in the tile (colour) buffer 220 when the rendered fragment data for this sampling position is written to the tile buffer, and a value of "1" is written to the corresponding bit 201 in the clear bits bitmap 200. (In this example, as shown in FIG. 11, it is assumed that the colour value 221 first written to the tile buffer 220 is representative of the colour white.)

Thus the solid colour checker 93 writes a "1" to a position in the clear bits bitmap 200 when rendered fragment data including a colour value that is the same as the colour value for the first sampling position written to the tile buffer 96 is being written to the tile buffer 96 for a sampling position corresponding to the position in the clear bits bitmap 200 (step 109, FIG. 10). Alternatively, the solid colour checker 93 writes a "0" to a position in the clear bits bitmap 200 when rendered fragment data including a colour value that is different from the colour value for the first sampling position written to the tile buffer 96 is being written to the tile buffer 96 for a sampling position corresponding to the position in the clear bits bitmap 200 (step 110, FIG. 10).

Thus, following rendered fragment data being written to the tile buffer 96 for the first sampling position in the tile, the solid colour checker 93 then determines if there are any further sampling positions in the tile left to be rendered, i.e. if there is any further rendered fragment data for the tile to be written to the tile buffer 96 (step 107, FIG. 10).

If there are more sampling positions in the tile left to be rendered then when rendered fragment data for a sampling position is written to the tile buffer 96, the colour value in the rendered fragment data for the sampling position is compared with the colour value in the rendered fragment data for the first written sampling position 221 (step 108, FIG. 10). When the colour value in the rendered fragment data for the sampling position is equal to the colour value in the rendered fragment data for the first written sampling position 221, a value of "1" is written to the bit in the clear bits bitmap 200 for the position in the array corresponding to the sampling position (step 109, FIG. 10). When the colour value in the rendered fragment data for the sampling position is different to the colour value in the rendered fragment data for the first written sampling position 221, a value of "0" is written to the bit in the clear bits bitmap 200 for the position in the array corresponding to the sampling position (step 110, FIG. 10).

As can be seen from FIG. 11, in this example all of the sampling positions 222 in the tile have a colour value representative of the colour white in the tile (colour) buffer 220 and thus all the corresponding positions 202 in the clear bits bitmap are marked with the value one. (In the case where any sampling positions in the tile have a colour value representative of a colour that is not the same as the first colour written for the tile, the corresponding positions in the clear bits bitmap 200 would be marked with the value "0" to indicate that).

When all of the rendered fragment data for the tile has been written to the tile buffer 96, the solid colour checker 93 then determines if all of the sampling positions have a colour value associated with them in the rendered fragment data that is the same, i.e. if all of values in the array of the bitmap are equal to one (step 111, FIG. 10). (In the example shown in FIG. 11, the bitmap 200 will indicate that the sampling positions all have associated with them the same rendered colour.)

When the solid colour checker 93 identifies a tile that has the same colour value associated with each of the sampling positions in the tile, the solid colour checker 93 signals to the writeback unit 98 that the tile is a constant colour. The writeback unit 98 then writes out a header data block of the form shown in FIG. 8 for the tile (to represent the tile in a stored data array that the tile is part of). In this case, the "same" colour value that is indicated in the header data block is the colour value that has been rendered to all of the sampling positions for the tile.

When the solid colour checker 93 does not determine that the tile has the same colour value associated with each of its sampling positions, the writeback unit 98 writes out the rendered fragment data to the frame buffer 97 (step 105, FIG. 10), using the frame buffer compression technique described above (and as described in the Applicant's U.S. Pat. Nos. 8,542,939 B2, 9,014,496 B2, 8,990,518 B2 and 9,116,790 B2).

The data ultimately written to the frame buffer 97 may then be output, e.g. displayed. The process described above for one tile is repeated for each of the tiles in a frame, and then repeated for the subsequent frames being rendered by the graphics processing pipeline 91.

In the above example, it is assumed the blocks that the data array is divided into (and for which header data blocks, and potentially additionally sub-blocks data, are stored) correspond to the tiles that the graphics processor is generating. However, it would also be possible for the blocks that the data array is divided into for the purposes of encoding and storing the data array in the manner of the present embodiments do not correspond to tiles that the graphics processor produces. For example, each block could comprise only some but not all (a fraction) of a tile, or a block could be made up of plural tiles.

The above primarily describes the way in the present embodiments that the data array is processed and stored in memory for use. When the so-stored data array comes to be used, for example to apply to fragments to be rendered (where the stored data array is a texture map for use in graphics processing), then the reading and decoding process for the stored data array will essentially comprise the reverse of the above storing and encoding process.

Thus, the decoding device, such as a graphics processor (e.g. where the stored data array is texture map) or a display controller (e.g., where the stored data array is a frame to be displayed), will first identify the position(s) of the particular element or elements in the data array that are of interest (i.e., whose values are to be determined). It will then determine the start address A of the header buffer for the data array (if necessary, this can be communicated to the decoder by the, e.g., software that controls the encoder and decoder setting a control register with a pointer to the header buffer), and then use that start address together with the position of the data array element or elements that are of interest to determine the location of the header data block for the block of the data array that the data element(s) position(s) falls within in the manners discussed above.

The decoder will then read the header data block from the identified memory location and determine therefrom the pointer data and sub-block size data indicating the memory location of the relevant sub-block data of the block of the data array that should be used to reproduce the data element or elements (position(s)) in question. The decoder will then, e.g. read, and use the relevant sub-block data from the determined memory location, and decode that data, using if necessary any other encoded data that is stored in the header data block (as discussed above), to determine the value of the data element or elements (position(s)) of interest.

This decoding process should also take account of any predefined "special case" sub-block size indication values, as discussed above. Thus, if the decoder identifies in the header data block a sub-block size value indicating a "copy" sub-block, the decoder should accordingly use the sub-block data that was (or that would be) used for the preceding block to determine the value of the data element or elements (position(s)) in question.

Correspondingly, where a header data block includes a copy block size indication value in the size indication field for the first sub-block of the set of sub-blocks that the header data block in question relates to, as in the header data block configuration shown in FIG. 8, the decoder will then determine the data value to use for the data element (position) in question from the data value information included in the header data block, without reading or attempting to read any separate sub-blocks data for the block in question.

This process can then be repeated for each data element (position) of interest (whose value is required).

Figure 12:
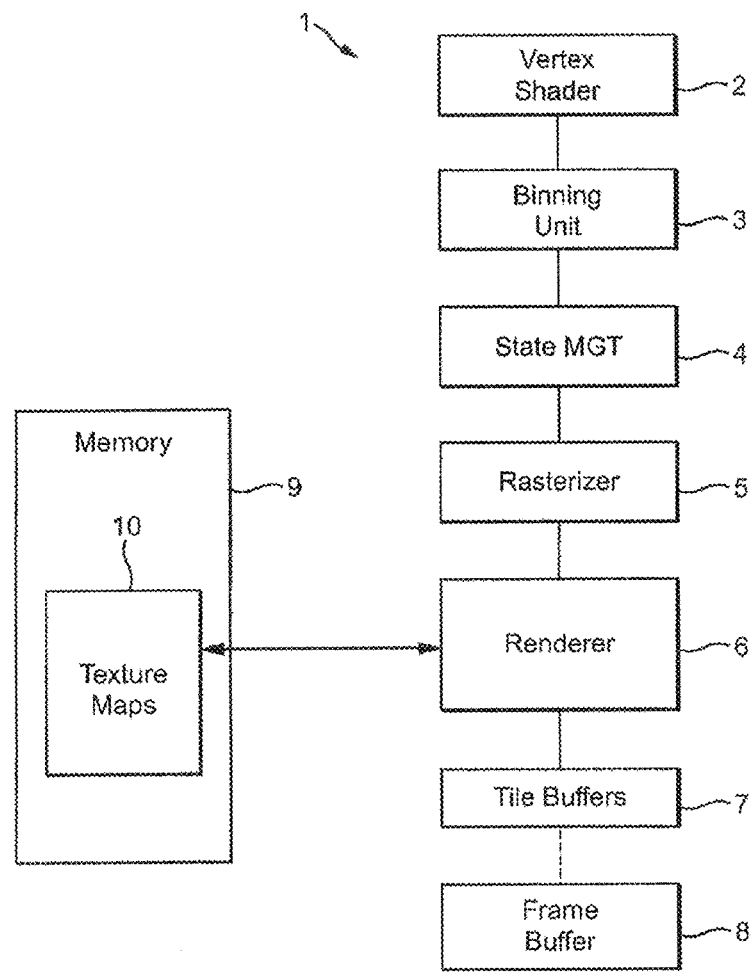
FIG. 12 shows schematically a graphics processing system that may use data arrays stored in accordance with the technology described herein.

FIG. 12 shows schematically an arrangement of a graphics processing system 1 that can store and use data arrays that have been stored in the manner of the present embodiment.

FIG. 12 shows a tile-based graphics processing system. However, as will be appreciated, the technology described herein can be implemented in other arrangements of graphics processing system as well (and, indeed, in other data processing systems).

The system includes, as shown in FIG. 12, a tile-based graphics processor (GPU) 1. This graphics processor 1 generates output data arrays, such as output frames intended for display on a display device, such as a screen or printer, in response to instructions to render graphics objects, etc. that it receives.

As shown in FIG. 12, the graphics processor 1 includes a vertex shader 2, a binning unit 3, a state management unit 4, a rasterising stage 5, and a rendering stage 6 in the form of a rendering pipeline.

The vertex shader 2 receives descriptions of graphics objects to be drawn, vertices, etc., e.g. from a driver (not shown) for the graphics processor 1, and performs appropriate vertex shading operations on those objects and vertices, etc., so as to, for example, perform appropriate transform and lighting operations on the objects and vertices.

The binning unit 3 sorts (bins) the various primitives, objects, etc., required for an output to be generated by the graphics processor 1 (such as a frame to be displayed) into the appropriate bins (tile lists) for the tiles that the output to be generated is divided into (since, as discussed above, this exemplary graphics processing system is a tile-based graphics processing system).

The state management unit 4 stores and controls state data and the state of the graphics processing units to control the graphics processing operation.

The rasteriser 5 takes as its input primitives to be displayed, and rasterises those primitives to sampling positions and fragments to be rendered.

The rendering pipeline 6 takes fragments from the rasteriser 5 and renders those fragments to generate the output data (the data for the output (e.g. frame to be displayed) of the graphics processor 1).

The rendering pipeline will include a number of different processing units, such as fragment shaders, blenders, texture mappers, etc.

In particular, as shown in FIG. 12, the rendering unit 6 will, inter alia, access texture maps 10 stored in a memory 9 that is accessible to the graphics processor 1, so as to be able to apply the relevant textures to fragments that it is rendering. The memory 9 where the texture maps 10 are stored may be an on-chip buffer or external memory (e.g. main system memory) that is accessible to the graphics processor 1.

The graphics processor 1 generates its output data arrays, such as output frames, by generating tiles representing different regions of a respective output data array (as it is a tile-based graphics processor). Thus, the output from the rendering pipeline 6 (the rendered fragments) is output to tile buffers 7.

The tile buffers' outputs are then written to a frame buffer 8, e.g. for display. The frame buffer 8 may reside, e.g. in main memory (which memory may be DDR-SDRAM) of the system (not shown). The data from the tile buffers may be downsampled before it is written to the frame buffer, if desired.

The texture maps 10 and the frame buffer 8 may be stored in the same physical memory, or they may be stored in different memories, as desired.

Sometime later, the data array in the frame buffer 3 will be read, e.g. by a display controller and output to a display device for display (not shown).

The graphics processing system shown in FIG. 12 uses the data array storing and decoding arrangements of the embodiments described above in respect of both the stored texture maps 10 in the memory 9, and when storing its output data in the frame buffer 8.

Thus, each texture map 10 that is stored in the memory 9 for use by the rendering unit 6 is stored in the form of one of the embodiments described above. Accordingly, when the rendering unit 6 needs to access a texture map, it will read and decode the texture map data in the manners described above.

Similarly, when the generated output data from the graphics processor 1 is written to the frame buffer 8 from the tile buffer 7, that data is processed in one of the manners described above, to take the data from the tile buffers 7 and store it in one of the formats described above in the frame buffer 8. This data can then be read and decoded from the frame buffer 8 in the manners described above by, e.g., the display controller of the display on which the frame is to be displayed.

It will be appreciated that each of the stages, elements, and units, etc., of the graphics processor as shown in FIG. 12 may be implemented as desired and will accordingly comprise, e.g., appropriate processing circuitry, such as processing logic, programmable processing logic, etc., for performing the necessary operations and functions, and will provide the appropriate control and processing circuitry, etc., for performing the technology described herein.

It will also be appreciated here that FIG. 12 simply shows the arrangements schematically, and thus, for example, the data flow in operation of the technology described herein need not and may not be as shown in FIG. 12, but may, for example, involve the looping back of data as between the various units and stages shown in FIG. 12 as appropriate.

Although the present embodiments have been described above with particular reference to the use of the techniques of the present embodiment with graphics processors and display controllers, the techniques of the technology described herein can be used for other data array and in particular image processing arrangements. For example, they may be used in image signal processors and video decoders and encoders (MPEG/h.264, etc.). In these cases, for example, the techniques of the technology described herein could be used to store an image generated by an image signal processor which is processing data received from an image sensor to make a watchable image out of it. A video encoder/decoder, for example, could load an image (e.g. video frame) stored in the form of the technology described herein to then compress the image using some other standard like h.264, and correspondingly store frames of video data using the techniques of the technology described herein, for example for provision to a graphics processor or a display controller.

As can be seen from the above, the technology described herein, in its embodiments at least, provides a method and apparatus for storing data arrays that can allow the stored data to take less memory space (to be stored more efficiently), reduce the amount of memory traffic for reading the stored data, and/or make more efficient the memory traffic for reading the stored data. It can accordingly, thereby reduce power consumption.

This is achieved, in the embodiments at least, by dividing a data array to be stored into plural blocks, further dividing each respective block of the data array into a set of sub-blocks, and storing data representing the sub-blocks and a header data block for each block that the data array is divided into.

It is further determined whether all the data positions for a block that the data array has been divided into have the same data value associated with them, and in that case, the header data block for such a block of the data array is configured to store an indication that all of the data positions within the block have the same data value associated with them and an indication that the same data value that is associated with each of the data positions in the block.

In embodiments, blocks having the same data value associated with all of the data positions in the block are identified based on the writing of data to a buffer for data positions in a block.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

The invention claimed is:

1. A method of determining a data value to use for a data position of a stored data array in a data processing system, the method comprising:
   reading by processing circuitry a stored header data block for a block of the data array that the data position falls within;
   determining by processing circuitry whether the header data block contains an indication that all of the data positions for the block of the data array have the same data value;
   and, when it is determined from the header data block that all of the data positions of the stored data array for the block of the data array that the header data block relates to do not have the same data value:
   reading by processing circuitry from the header data block for the block of the data array that the data position falls within data relating to a plurality of sub-blocks that the block of the data array that the header data block relates to has been divided into, each sub-block comprising a plurality of data positions of the data array;
   using the data relating to the plurality of sub-blocks read from the header data block to locate by processing circuitry a set of sub-block data for at least one sub-block of the sub-blocks that the block of the data array that the header data block relates to has been divided into, wherein the set of sub-block data is stored separately to the header data block;
   reading by processing circuitry the set of sub-block data, wherein the set of sub-block data comprises data indicating the data values to use for data positions of the at least one sub-block; and
   determining by processing circuitry the value to use for the data position from the set of sub-block data;
   but, when it is determined from the header data block that all of the data positions of the stored data array for the block of the data array that the header data block relates to have the same data value:
   determining by processing circuitry from other data stored in the header data block and not from a separate set of sub-block data the value to use for the data position.

2. The method of claim 1, comprising determining whether the header data block contains an indication that all of the data positions for the block of the data array have the same data value based on the presence or not of a particular data value in a particular position in the header data block.

3. The method of claim 1, comprising determining from other data stored in the header data block the value to use for the data position by reading by processing circuitry a data value that is associated with each of the data positions in the block in an uncompressed form in the header data block.

4. The method of claim 1, wherein each header data block comprises a data field for storing pointer data indicating a base memory location for data for the set of sub-blocks that the block of the data array that the header data block relates to has been divided into, and data fields for storing a size indication value for each sub-block of the set of sub-blocks that the header data block corresponds to.

5. The method of claim 4, further comprising at least one of:
determining that the header data block contains an indication that all of the data positions within the block have the same data value associated with them by reading by processing circuitry a particular data value in the data field for storing a size indication value for a particular sub-block of the set of sub-blocks that the header data block corresponds to.

6. The method of claim 4, further comprising:
determining a base memory location for the data for the set of sub-blocks that a header data block corresponds to by reading by processing circuitry pointer data stored in the data field for storing pointer data indicating a base memory location for the data for the set of sub-blocks that the header data block corresponds to, wherein the pointer data uses a floating point number representation.

7. An apparatus for determining a data value to use for a data position of a stored data array in a data processing system, the apparatus comprising:
reading circuitry configured to read a stored header data block for a block of the data array that the data position falls within;
determining circuitry configured to determine whether the header data block contains an indication that all of the data positions for the block of the data array have the same data value;
and the determining circuitry is further configured to, when it is determined from the header data block that all of the data positions of the stored data array for the block of the data array that the header data block relates to do not have the same data value:
read from the header data block for the block of the data array that the data position falls within data relating to a plurality of sub-blocks that the block of the data array that the header data block relates to has been divided into, each sub-block comprising a plurality of data positions of the data array;
locate a set of sub-block data for at least one sub-block of the sub-blocks that the block of the data array that the header data block relates to has been divided into using the data relating to the plurality of sub-blocks read from the header data block, wherein the set of sub-block data is stored separately to the header data block;
read the set of sub-block data, wherein the set of sub-block data comprises data indicating the data values to use for data positions of the at least one sub-block; and
determine the value to use for the data position from the set of sub-block data;
and the determining circuitry is further configured to, when it is determined from the header data block that all of the data positions of the stored data array for the block of the data array that the header data block relates to have the same data value:
determine from other data stored in the header data block and not from a separate set of sub-block data the value to use for the data position.

8. The apparatus of claim 7, wherein the determining circuitry is configured to determine whether a header data block contains an indication that all of the data positions for the block of the data array have the same data value based on the presence or not of a particular data value in a particular position in the header data block.

9. The apparatus of claim 7, wherein the determining circuitry is configured to determine from other data stored in the header data block the value to use for the data position by reading a data value that is associated with each of the data positions in the block in an uncompressed form in the header data block.

10. The apparatus of claim 7, wherein each header data block comprises a data field for storing pointer data indicating a base memory location for data for the set of sub-blocks that the header data block corresponds to, and data fields for storing a size indication value for each sub-block of the set of sub-blocks that the header data block corresponds to.

11. The apparatus of claim 10, wherein the determining circuitry is configured to determine that the header data block contains an indication that all of the data positions within the block have the same data value associated with them by reading a particular data value in the data field for storing a size indication value for a particular sub-block of the set of sub-blocks that the header data block corresponds to.

12. The apparatus of claim 10, wherein the determining circuitry is configured to determine a base memory location for the data for the set of sub-blocks that a header data block corresponds to by reading pointer data stored in the data field for storing pointer data indicating a base memory location for the data for the set of sub-blocks that the header data block corresponds to, wherein the pointer data uses a floating point number representation.

13. A non-transitory computer readable storage medium storing computer software code which when executing on at least one processor performs a method of determining a data value to use for a data position of a stored data array in a data processing system, the method comprising:
reading by processing circuitry a stored header data block for a block of the data array that the data position falls within;
determining by processing circuitry whether the header data block contains an indication that all of the data positions for the block of the data array have the same data value;
and, when it is determined from the header data block that all of the data positions of the stored data array for the block of the data array that the header data block relates to do not have the same data value:
reading by processing circuitry from the header data block for the block of the data array that the data position falls within data relating to a plurality of sub-blocks that the block of the data array that the header data block relates to has been divided into, each sub-block comprising a plurality of data positions of the data array;
using the data relating to the plurality of sub-blocks read from the header data block to locate by processing circuitry a set of sub-block data for at least one sub-block of the sub-blocks that the block of the data array that the header data block relates to has been divided into, wherein the set of sub-block data is stored separately to the header data block;
reading by processing circuitry the set of sub-block data, wherein the set of sub-block data comprises data indicating the data values to use for data positions of the at least one sub-block; and determining by processing circuitry the value to use for the data position from the set of sub-block data;

but, when it is determined from the header data block that all of the data positions of the stored data array for the block of the data array that the header data block relates to have the same data value:

determining by processing circuitry from other data stored in the header data block and not from a separate set of sub-block data the value to use for the data position.

* * * * *